(12) United States Patent
Choi et al.

(10) Patent No.: US 10,409,439 B2
(45) Date of Patent: Sep. 10, 2019

(54) USER TERMINAL APPARATUS AND CONTROLLING METHOD THEREOF

(71) Applicant: Samsung Electronics Co., Ltd., Suwon-si, Gyeonggi-do (KR)

(72) Inventors: Youn-ho Choi, Seoul (KR); Il-ho Lee, Suwon-si (KR); Hyun-sub Park, Suwon-si (KR); Wan-ho Roh, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 156 days.

(21) Appl. No.: 15/241,879

(22) Filed: Aug. 19, 2016

(65) Prior Publication Data
US 2017/0038915 A1 Feb. 9, 2017

Related U.S. Application Data

(63) Continuation of application No. 15/180,760, filed on Jun. 13, 2016, now abandoned.

(30) Foreign Application Priority Data

Jan. 7, 2016 (KR) .................. 10-2016-0002217

(51) Int. Cl.
*G06F 1/16* (2006.01)
*G06F 3/14* (2006.01)
(Continued)

(52) U.S. Cl.
CPC ............ *G06F 3/0481* (2013.01); *G06F 1/165* (2013.01); *G06F 1/1652* (2013.01);
(Continued)

(58) Field of Classification Search
CPC .............................. G06F 1/1626; G06F 3/041
(Continued)

(56) References Cited

U.S. PATENT DOCUMENTS 8,416,148 B1* 4/2013 Park .................. G06F 3/041
345/1.1
9,377,892 B2* 6/2016 Kim .................. G06F 3/0416
(Continued)

FOREIGN PATENT DOCUMENTS

CN 202975903 U 6/2013
CN 104272853 A 1/2015
(Continued)

OTHER PUBLICATIONS

China State Intellectual Property Office; Chinese Office Action; dated Oct. 17, 2018; pp. 1-20; Application No. 201610756584.4.

*Primary Examiner* — Cao H Nguyen
(74) *Attorney, Agent, or Firm* — Jefferson IP Law, LLP

(57) ABSTRACT

A user terminal apparatus is provided. The user terminal apparatus includes a display consisting of a main display area disposed on a front side of the user terminal apparatus and a sub display area extended from one side of the main display area to be disposed on at least one area of a rear side of the user terminal apparatus, and a processor configured to provide a lock screen to a display area of at least one of the main display area and the sub display area and, in response to a user input of releasing the lock screen being sensed, control the display to provide a different home screen based on a display area where the user input is sensed.

20 Claims, 26 Drawing Sheets

Related U.S. Application Data

(60) Provisional application No. 62/201,163, filed on Aug. 5, 2015.

(51) Int. Cl.
*G06F 21/31* (2013.01)
*G06F 3/0481* (2013.01)
*G06F 21/36* (2013.01)
*G06F 3/0487* (2013.01)
*G06F 3/0488* (2013.01)

(52) U.S. Cl.
CPC ........ *G06F 3/0487* (2013.01); *G06F 3/04883* (2013.01); *G06F 3/1423* (2013.01); *G06F 21/31* (2013.01); *G06F 21/36* (2013.01); *G09G 2330/022* (2013.01); *G09G 2354/00* (2013.01); *G09G 2358/00* (2013.01); *G09G 2380/02* (2013.01)

(58) Field of Classification Search
USPC .......................... 715/740, 760, 780, 761–765
See application file for complete search history.

(56) References Cited

U.S. PATENT DOCUMENTS

| | | | |
|---|---|---|---|
| 2006/0209208 A1* | 9/2006 | Kim | H04N 5/44543 348/468 |
| 2010/0045621 A1* | 2/2010 | Kang | G06F 1/1626 345/173 |
| 2011/0128241 A1* | 6/2011 | Kang | G06F 1/1643 345/173 |
| 2013/0285881 A1 | 10/2013 | Loo et al. | |
| 2015/0035770 A1 | 2/2015 | Lee et al. | |
| 2016/0070407 A1* | 3/2016 | Jeon | G06F 1/1626 345/173 |

FOREIGN PATENT DOCUMENTS

| | | |
|---|---|---|
| EP | 2 779 603 A2 | 9/2014 |
| JP | 4569510 B2 | 10/2010 |
| KR | 10-1488391 B1 | 1/2015 |
| WO | 2013/103278 A1 | 7/2013 |
| WO | 2013/172507 A1 | 11/2013 |
| WO | 2014/171578 A1 | 10/2014 |
| WO | 2014/204048 A1 | 12/2014 |

* cited by examiner

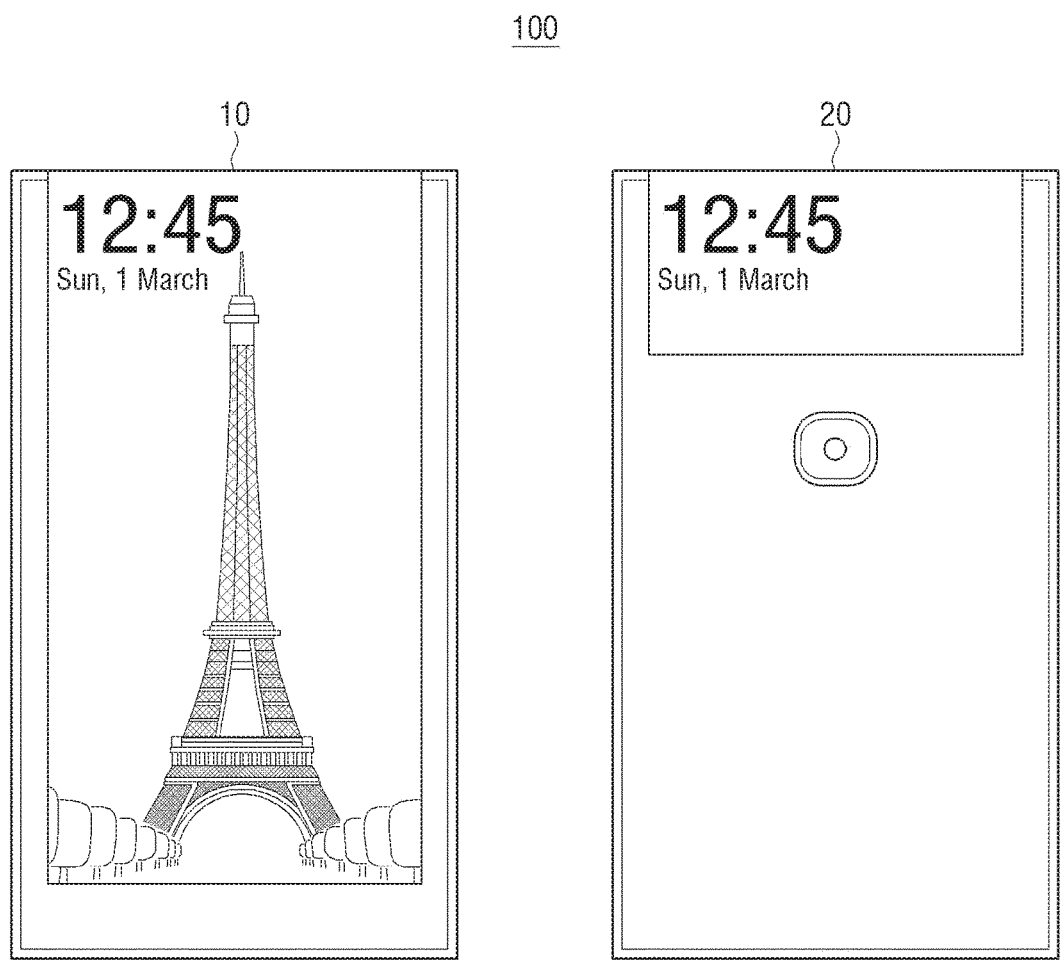

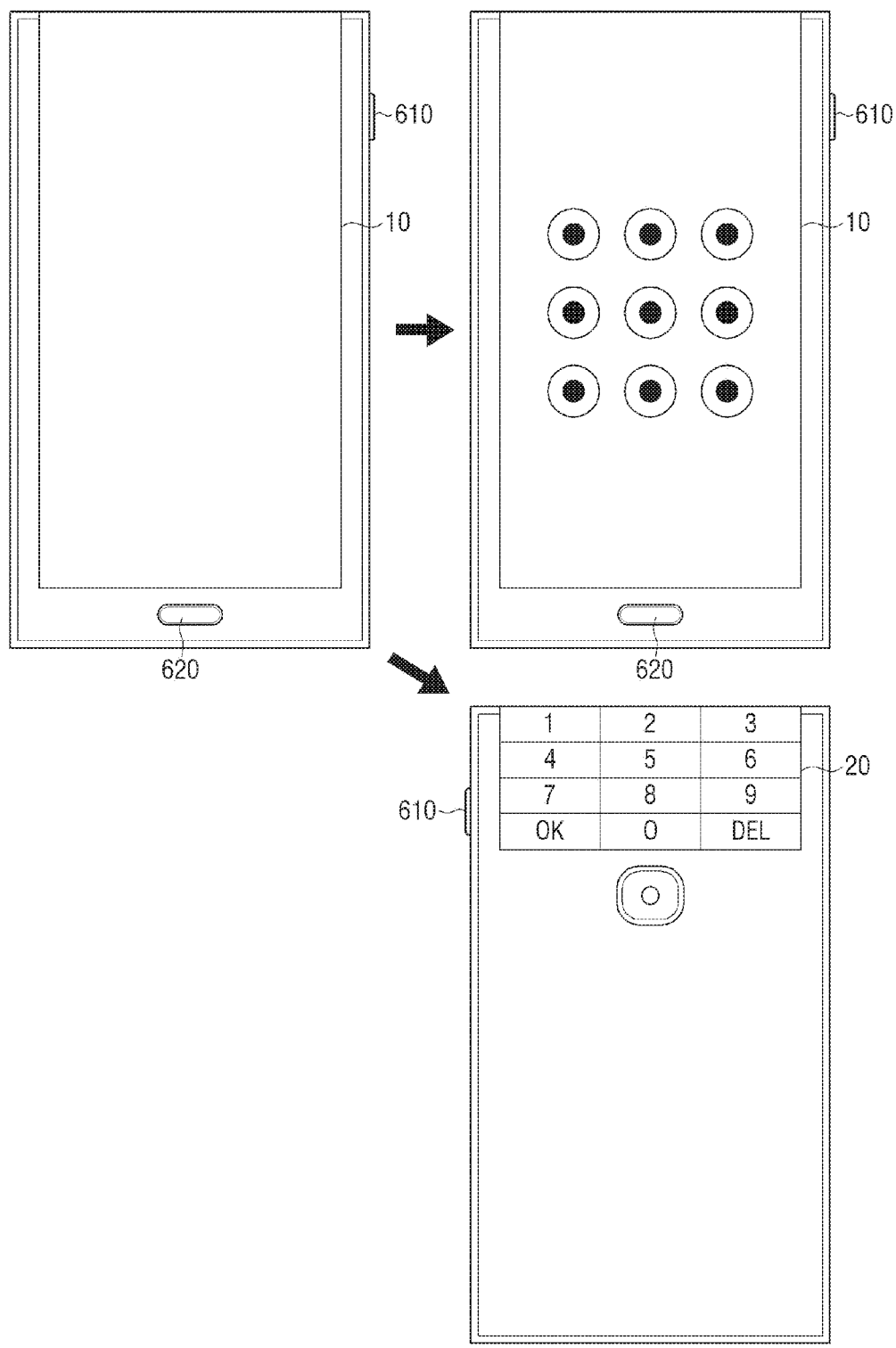

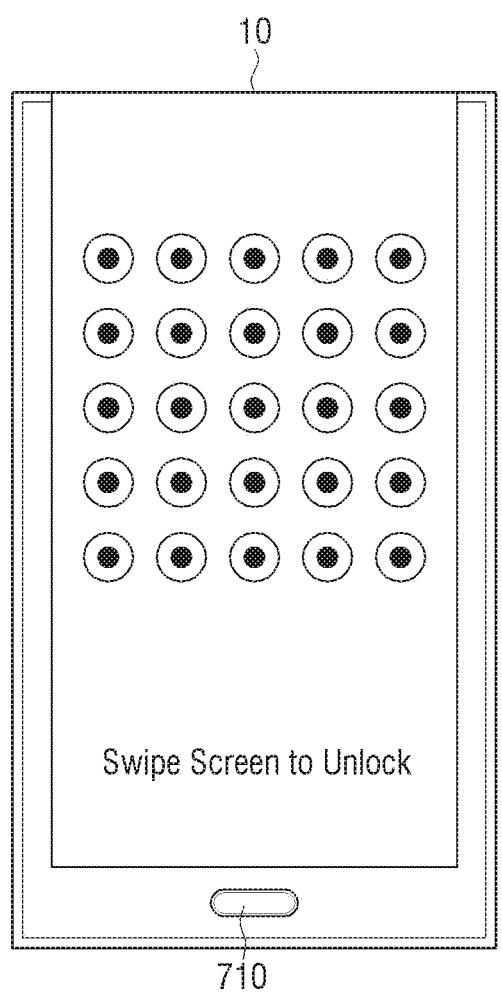

USER TERMINAL APPARATUS AND CONTROLLING METHOD THEREOF

CROSS-REFERENCE TO RELATED APPLICATION(S)

This application is a continuation application of prior application Ser. No. 15/180,760, filed on Jun. 13, 2016 in the U.S. Patent and Trademark Office, which claimed the benefit under 35 U.S.C. § 119(e) of a U.S. Provisional application filed on Aug. 5, 2015 in the U.S. Patent and Trademark Office and assigned Ser. No. 62/201,163, and under 35 U.S.C. § 119(a) of a Korean patent application filed on Jan. 7, 2016 in the Korean Intellectual Property Office and assigned Serial number 10-2016-0002217, the entire disclosure of each of which is hereby incorporated by reference.

TECHNICAL FIELD

The present disclosure relates to a user terminal apparatus and a controlling method thereof. More particularly, the present disclosure relates to a user terminal apparatus which provides various lock screens and home screens and a controlling method thereof.

BACKGROUND

With the development of electronic technologies, various types of electronic apparatuses have been developed for use. Recently, a half-round, semi-circle or rolled display has been developed in which, a display is extended to the back side of an electronic apparatus using out-bending.

In doing so, a display may now be provided on several surfaces or sides of an electronic apparatus resulting in a display that is divided into a plurality of display areas and thus, creating a limit to the display area which can be viewed by a user at a one time.

Accordingly, when an event occurs, it becomes an important issue to decide on which display area information should be provided. In addition, it becomes necessary to secure various ways to implement a manipulation method of providing information on a desired display area and a method of exchanging information between each display area.

The above information is presented as background information only, and to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide a user terminal apparatus which provides various lock screens and home screens using displays which are disposed on the front side and the rear side of the user terminal apparatus, and a controlling method thereof.

In accordance with an aspect of the present disclosure, a user terminal apparatus is provided. The user terminal apparatus includes a display consisting of a main display area disposed on a front side of the user terminal apparatus and a sub display area extended from one side of the main display area to be disposed on at least one area of a rear side of the user terminal apparatus, and a processor to provide a lock screen to a display area of at least one of the main display area and the sub display area and, in response to a user input releasing the lock screen being sensed, control the display to provide a different home screen based on a display area where the user input is sensed.

In accordance with another aspect of the present disclosure, a controlling method of a user terminal apparatus is provided. The controlling method includes a display consisting of a main display area disposed on a front side of the user terminal apparatus and a sub display area extended from one side of the main display area to be disposed on at least one area of a rear side of the user terminal apparatus, including providing a lock screen to a display area of at least one of the main display area and the sub display area and, in response to a user input releasing the lock screen being sensed, providing a different home screen based on a display area where the user input is sensed.

According to the above-described various embodiments, a user terminal apparatus may provide various lock screens and home screens using displays which are disposed on the front side and the rear side of the user terminal apparatus. Accordingly, apparatus usability and convenience can be enhanced.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 1A to 1D are views illustrating a display structure of a user terminal apparatus according to various embodiments of the present disclosure;

FIGS. 6A to 6C are views illustrating a display apparatus providing a lock screen according to various embodiments of the present disclosure;

FIGS. 7A to 7C are views illustrating a type of a lock screen and a layout according to a display area of a display apparatus according to various embodiments of the present disclosure;

Throughout the drawings, like reference numerals will be understood to refer to like parts, components, and structures.

DETAILED DESCRIPTION

Figure 1C:
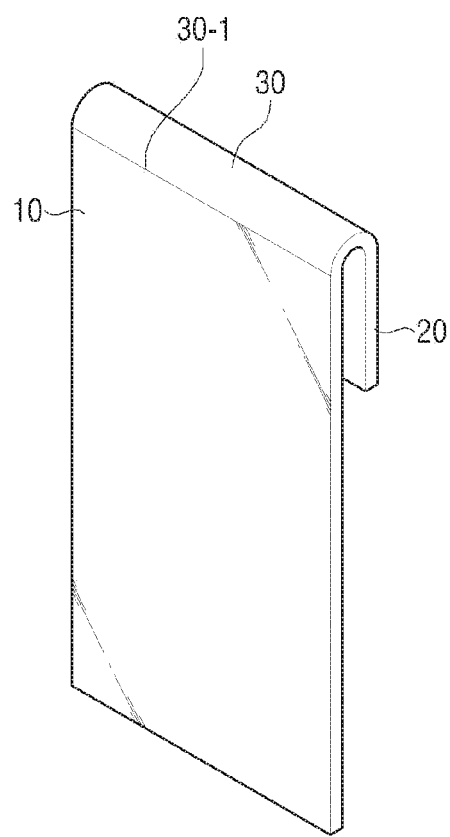

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

Terms such as "first" and "second" used in the following description may modify various elements regardless of an order and/or importance of the corresponding elements, and do not limit the corresponding elements. These terms may be used simply for the purpose of distinguishing one element from another element. For example, a first user device and a second user device may indicate different user devices regardless of the order or importance. As further example, a first element may be named a second element without departing from the scope of various embodiments of the present disclosure, and similarly, a second element may be named a first element.

It should be understood that when an element (for example, a first element) is "(operatively or communicatively) coupled with/to" or "connected with" another element (for example, a second element), the element may be directly coupled with/to the other element, or there may be an intervening element (for example, a third element) between the element and the other element. It should also be understood that when an element (for example, a first element) is "directly coupled with/to" or "directly connected to" another element (for example, a second element), there is no intervening element (for example, a third element) between the element and the other element.

All of the terms used herein including technical or scientific terms have the same meanings as those generally understood by an ordinary skilled person in the related art unless they are defined otherwise. The terms defined in a generally used dictionary should be interpreted as having the same meanings as the contextual meanings of the relevant technology, and should not be interpreted as having ideal or exaggerated meanings unless they are clearly defined in such a way in the following description. According to circumstances, even where the terms are so defined in the following description, the terms should not be interpreted as excluding embodiments of the present disclosure.

Hereinafter, various embodiments will be described in detail with reference to the accompanying drawings.

FIGS. 1A to 1D are views illustrating a display structure of a user terminal apparatus according to various embodiments of the present disclosure.

Referring to FIG. 1A, a front side of a user terminal apparatus 100 is illustrated.

Referring to FIG. 1B, a rear side of the user terminal apparatus 100 is illustrated. A front display is disposed on the front side of the user terminal apparatus 100, and a rear display is disposed on the rear side of the user terminal apparatus 100. The front display and the rear display may be connected to each other, and the rear display may be smaller than the front display. However, this is only an example, and the front display and the rear display may have the same size. Hereinafter, the front display will be referred to as a main display area 10 and the rear display will be referred to as a sub display area 20.

Referring to FIG. 1C, a front view of the entire display is illustrated where the main display area 10, the sub display area 20 and a round display area 30 are connected to one another.

Figure 1D:
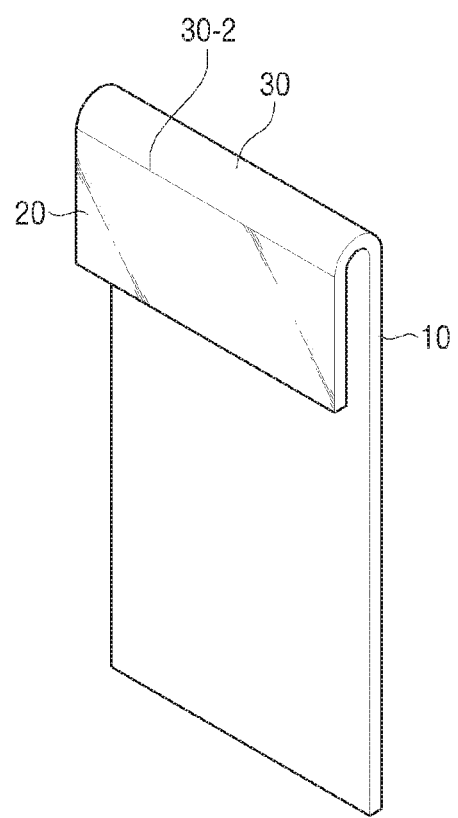

Referring to FIG. 1D, a rear view of the entire display is illustrated.

The sub display area 20 may be extended from one side of the main display area 10 to be disposed on at least one area of the rear side of the user terminal apparatus 100. In particular, the sub display area 20 may be extended to be bent from the upper side of the main display area 10. The bent area may be in the form of a curved surface, but is not limited thereto. The bent area may form an angle depending on the type of display.

The round display area 30 is an area which connects the main display area 10 and the sub display area 20. As described above, the round display area 30 may be in the form of a curved surface or in an angular form. The round display area 30 is distinguished from the main display area 10 and the sub display area 20 by border lines 30-1, 30-2.

The border lines 30-1, 30-2 of FIGS. 1C and 1D are only examples, and the border lines 30-1, 30-2 may be changed (e.g., relocated, increased in number or decreased in number). The border lines 30-1, 30-2 may be set by a manufacturer at the time of manufacturing, but may be changed by a user. When the border lines 30-1, 30-2 are changed, the sizes of the main display area 10, the sub display area 20 and the round display area 30 may be changed, and the sizes of the contents displayed on each area may be changed as well.

FIGS. 1A to 1D illustrate a case where the upper side of the user terminal apparatus 100 is covered, but one of the lower side, left side and right side of the user terminal apparatus 100 may also be covered. In addition, more than one side of the user terminal apparatus 100 may be simultaneously covered.

As the main display area 10, the sub display area 20 and the round display area 30 are connected to one another, various sensors and receivers may be provided on the side surface or on the lower surface of the user terminal apparatus 100. In particular, a directional receiver may be provided. However, this is only an example, and a receiver may be provided on an integrated cover (not shown) which can be interlocked with the user terminal apparatus 100. If a receiver is provided on the lower part of the user terminal apparatus 100, a screen (not shown) may also be reversed during phone conversations.

A structure where the sub display area 20 is extended from the main display area 10 via the round display area 30 in the form of a curved surface will now be described in greater detail.

In the following description, a direction towards the round display area 30 from the main display area 10 and the sub display area 20 will be referred to as the upper side of the user terminal apparatus 100, and the opposite direction will be referred to as the lower side of the user terminal apparatus 100. The left side and the right side will be described with reference to a display area viewed by a user. Accordingly, the left side and the right side would be reversed according to whether a user views the main display area 10 or the sub display area 20.

Figure 2A:
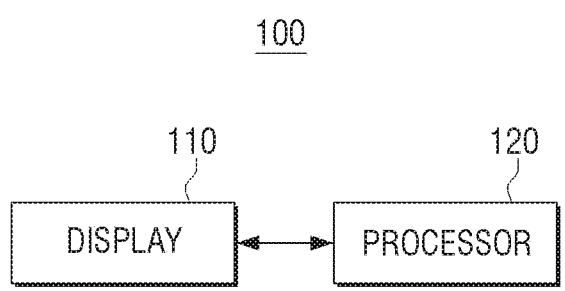
FIG. 2A is a block diagram illustrating a configuration of a user terminal apparatus according to an embodiment of the present disclosure.

FIG. 2A is a block diagram illustrating a user terminal apparatus according to an embodiment of the present disclosure.

Referring to FIG. 2A, a user terminal apparatus 100 includes a display 110 and a processor 120.

The display 110 may consist of the main display area 10 which is disposed on the front side of the user terminal apparatus 100, the sub display area 20 which is extended from one side of the main display area 10 and disposed on at least one area of the rear side of the user terminal apparatus 100, and the round display area 30 which connects the main display area 10 and the sub display area 20. However, this is only an example, and embodiments are not limited thereto. For example, the sub display area 20 may be configured to cover the entire rear side of the user terminal apparatus 100.

Here, the terms of the front side and the rear side are used for convenience of explanation and thus, embodiments should not be limited thereto. For example, as for a specific electronic apparatus, the front side and the rear side may be interpreted as one side and another side. In regard to the above described embodiment of FIGS. 1A to 1D, the sub display area 20 is extended from one side of the main display area 10, but this is only an example. For example, the sub display area 20 may be extended from all sides of the main display area 10 such that the user terminal apparatus 100 as a whole is covered by the display 110.

The sub display area 20 of the display 110 may be curved and extended from the upper side of the main display area 10 to be disposed on the upper area of the rear side. For example, when viewing the main display area 10 and the sub display area 20 from the side, the connection part of the round display area 30 may form a curved line in the shape of the letter 'U'. However, this is only an example, and when viewing the main display area 10 and the sub display area 20 from the side, the connection part of the display area may form a 90° angle in the shape of a structure '⌐'. Further, various connection parts may be formed based on the shape of the user terminal apparatus 100.

The display 110 may display various user interfaces (UIs) under the control of the processor 120. For example, the display 110 may display a UI for reproducing contents, a UI for making a phone call, and the like. The display 110 may also display different contents on each of the main display area 10, the sub display area 20 and the round display area 30, under the control of the processor 120. For example, the display 110 may display a video on the main display area 10, an image on the sub display area 20, and a UI for message transmission on the round display area 30.

In addition, the display 110 may interlock at least two areas of the main display area 10, the sub display area 20 and the round display area 30, and display contents in response thereto. For example, the display 110 may display a video on the main display area 10, a UI for controlling the video on the sub display area 20, and a UI for providing a function which is not related to the video on the round display area 30.

Further, the display 110 may display the same contents on at least two areas from among the main display area 10, the sub display area 20 and the round display area 30. For example, the display 110 may display the same contents on the main display area 10 and the sub display area 20, and display separate contents on the round display area 30.

The display 110 may be implemented as a liquid crystal display (LCD) panel, an organic light emitting diodes (OLED) display, a plasma display panel (PDP), and the like, but is not limited thereto. In addition, the display 110 may be implemented as a transparent display, a flexible display, an impact resistant display, and the like, depending on circumstances.

The processor 120 may control the overall operations of the user terminal apparatus 100.

The processor 120 may provide a lock screen to a display area of at least one of the main display area 10, the sub display area 20 and the round display area 30. For example, the processor 120 may provide a pattern lock screen to the main display area 10 and provide a personal identification number (PIN) lock screen to the sub display area 20. In addition, the processor 120 may provide a swipe lock screen to the round display area 30.

Here, the lock screen is a screen for receiving user authentication, authorization, and the like, before a home screen is provided. The lock screen may be one of a swipe lock screen, a biometric information lock screen, a pattern lock screen, a PIN lock screen, and a password lock screen. However, these are only examples, and other types of lock screens may be provided.

If a lock screen is provided on a plurality of areas, the processor 120 may provide a different type of lock screen to each area. However, this is only an example, and the processor 120 may provide the same type of lock screen to each of the plurality of areas. In this case, the processor 120 may change a UI of the lock screen and provide the changed UI to each of the plurality of areas. For example, when the processor 120 provides a swipe lock screen to a plurality of areas, the swipe lock screen provided to the sub display area 20 may be a different UI from the lock screen provided to the main display area 10.

If a user input to provide a lock screen to the display 110 is sensed, the processor 120 may determine the display area where the lock screen is to be provided based on the orientation of the user terminal apparatus 100 at a time when the user input to provide the lock screen is sensed. Here, the orientation of the user terminal apparatus 100 may be sensed by a geomagnetic sensor, a gyro sensor, an acceleration sensor, and the like, as described in greater detail below.

For example, the processor 120 may provide a lock screen to a display area of at least one of the main display area 10, the sub display area 20 and the round display area 30 according to the manipulation of a power button while information is not provided to the display 110. In particular, when the manipulation such as pressing of a power or other button is sensed, the processor 120 may provide a lock screen on a display area which faces upward. Alternatively, when the manipulation of a power button is sensed, the processor 120 may provide a lock screen on the display area where a user's face gazes by recognizing the user or user's face.

The display area for providing a lock screen may be predetermined. For example, if it is predetermined that the display area for providing a lock screen is the round display area 30, the processor 120 may provide a lock screen to the round display area 30 without considering the orientation of the user terminal apparatus 100.

The processor 120 may also provide a lock screen in response to a touching of a display area, a shaking of the user terminal apparatus, and the like, other than by using the manipulation of a power button. In this case, the processor 120 may determine the area where a lock screen is to be provided based on the type of manipulation to provide the lock screen.

The processor 120 may change at least one of the type and shape of a lock screen based on the display area where the lock screen is to be provided. For example, the processor 120 may provide a pattern lock screen in a more complicated pattern when displaying the lock screen on the main display area 10 than when displaying the screen on the sub display area 20.

In addition, even if a lock screen is set to a pattern lock screen, the processor 120 may display a password lock screen on the sub display area 20.

In this case, if the orientation of the user terminal apparatus 100 is changed while a lock screen is provided, the processor 120 may change at least one of the type, shape and display area of the lock screen. For example, if the user terminal apparatus 100 is turned over while a lock screen is provided on the main display area 10, the processor 120 may provide a lock screen on the sub display area 20. In this case, the lock screen provided on the sub display area 20 may be different from the lock screen provided on the main display area 10 in at least one of type and shape of lock screen.

The processor 120 may also provide a lock screen to at least one of the main display area 10 and the sub display area 20, and if the user input of touching the lock screen and dragging the touched lock screen in the direction of a different display area on the display 110 is sensed, the processor 120 may move the lock screen and provide the lock screen on another display area. For example, if the processor 120 provides a lock screen on the main display area 10 and the user input of touching the lock screen and dragging the touch lock screen in an upper direction is sensed, the processor 120 may provide a lock screen on the sub display area 20 or on the round display area 30. In this case, the processor may determine the display area to provide the lock screen between the sub display area 20 and the round display area 30 based on the speed of the user's dragging input. In addition, if the user's touch and dragging input is sensed, the processor 120 may change at least one of the type and shape of the lock screen based on the display area where the lock screen is to be provided.

If the user input of releasing a lock screen is sensed while the lock screen is provided, the processor 120 may control the display to provide a different home screen based on the display area where the user input is sensed. For example, if the user input is sensed on the sub display area 20, the processor 120 may provide only part of the home screen which is provided when the user input is sensed on the main display area 10.

Here, the home screen is a screen which is provided when the user terminal apparatus 100 is in a standby state, and may include at least one application, a widget regarding an application, and the like. The home screen may be configured by a user and may be changed in many ways.

The processor 120 may determine at least one of the type and the access rights of an application to be provided on the home screen based on the display area where a user input is sensed. For example, if a user input is sensed on the main display area 10 and a home screen is provided on the main display area 10, the processor 120 may permit access to all applications and provide all access rights. Alternatively, if a user input is sensed on the sub display area 20 and a home screen is provided on the sub display area 20, the processor 120 may limit access to some of the applications, and may limit some access rights even with those applications where access is permitted.

If access is limited to some applications or some access rights to the applications where access is permitted are limited, the processor 120 may include a graphical UI (GUI) for changing at least one of the type of applications provided and access rights of the applications provided in the home screen, and provide the home screen. The provided GUI may request a user to perform additional authentication, and once the additional authentication is completed, the processor 120 may change the type of applications and access rights of the applications provided.

Figure 2B:
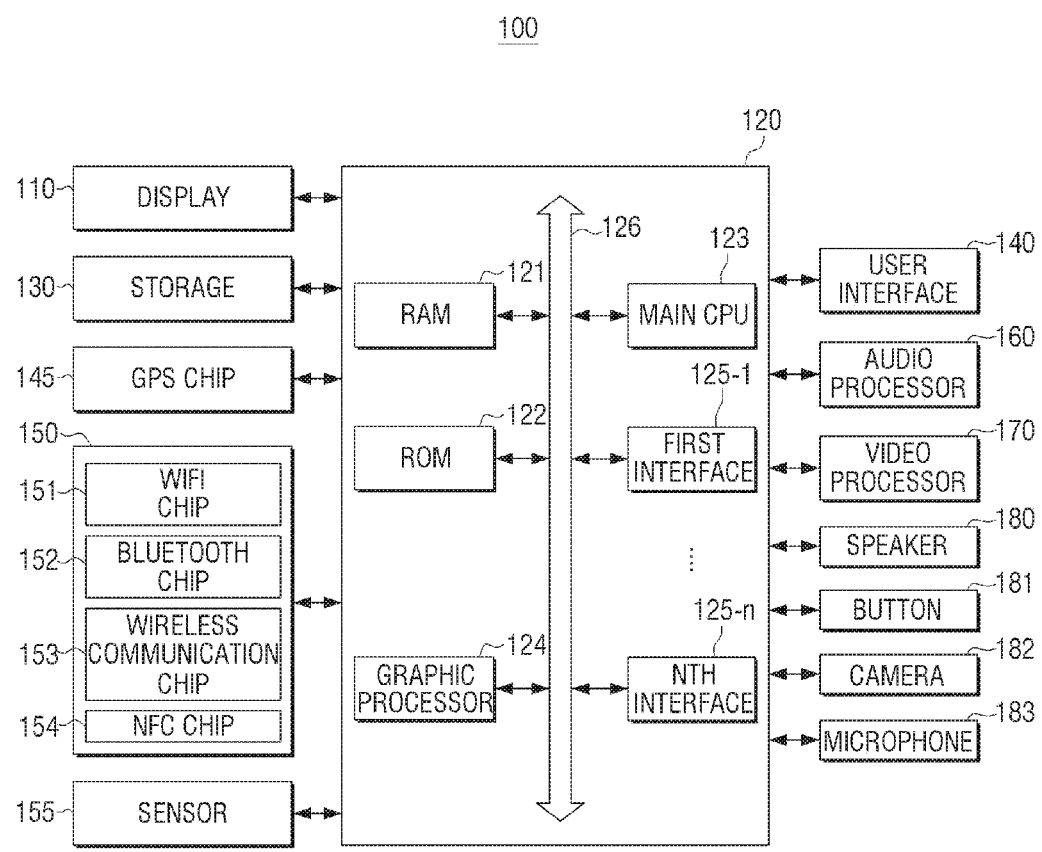
FIG. 2B is a block diagram illustrating a detailed configuration of a display apparatus according to an embodiment of the present disclosure.

FIG. 2B is a block diagram illustrating a detailed configuration of a display apparatus according to an embodiment of the present disclosure.

Referring to FIG. 2B, a display apparatus 100 includes the display 110, the processor 120, a storage 130, a UI 140, a global positioning system (GPS) chip 145, a communicator 150, a sensor 155, an audio processor 160, a video processor 170, a speaker 180, a button 181, a camera 182, and a microphone 183. The elements of FIG. 2B which correspond to elements of FIG. 2A will not be described in further detail.

As described above, the display 110 may be divided into the main display area 10, the sub display area 20 and the round display area 30. The display 110 may be realized as various forms of displays such as an LCD, an OLED display, a PDP, and the like. The display 110 may further include a driving circuit, a backlight unit, and the like, which can be embodied in the form of an amorphous silicon thin film transistor (a-si TFT), a low temperature poly silicon (LTPS) TFT, an organic TFT (OTFT), and the like. The display 110 may also be realized as a touch screen by combining the sensor 155 with a touch sensor.

In this case, the touch sensor may include at least one of touch panel and/or a pen recognition panel. The touch panel may sense a user's finger gesture input and output a touch event value corresponding to the sensed touch signal. The touch panel may be mounted below at least one of the main display area 10, the sub display area 20 and the round display area 30 of the display 110, but embodiments are not limited thereto.

The touch panel may sense a user's finger gesture input using two methods, a capacitive-type method and a resistive-type method. The capacitive-type method calculates touch coordinates by sensing the micro-electricity excited by part of the user's body. The resistive-type method includes two electrode plates embedded within a touch panel, and senses an electric current flow as the upper and the lower plates at the touched point are brought into contact with each other, and calculates touch coordinates based thereon.

The pen recognition panel may sense a user's pen gesture input according to the use of a touch pen (for example, a stylus pen, a digitizer pen, and the like), and output a pen proximity event value or a pen touch event value. The pen recognition panel may be mounted below at least one of the main display area 10, the sub display area 20 and the round display area 30 of the display 110.

The pen recognition panel may be implemented as, for example, an electromagnetic resonance (EMR) scheme and may sense a touch or a proximity input depending on a change in strength of an electric field due to the proximity or touch of the pen. In detail, the pen recognition panel may be configured to include an electromagnetic induction coil sensor (not illustrated) having a grid structure and an electronic signal processor (not illustrated) sequentially providing an alternating signal having a predetermined frequency to each loop coil of the electromagnetic induction coil sensor. If a pen having a resonance circuit embedded therein is present around the loop coil of the pen recognition panel, a magnetic field transmitted from the corresponding loop coil generates a current based on mutual electromagnetic induction to the resonance circuit in the pen. Based on the current, the induction magnetic field is generated from the coil configuring the resonance circuit within the pen and the pen recognition panel may detect the induction magnetic field from the loop coil in the signal receiving state to sense an approach position or a touched position of the pen.

The processor 120 controls the overall operations of the user terminal apparatus 100 using various programs stored in the storage 130.

Specifically, the processor 120 includes a random access memory (RAM) 121, a read only memory (ROM) 122, a main central processing unit (CPU) 123, a graphic processor 124, first to nth interfaces 125-1~125-n, and a bus 126.

The RAM 121, the ROM 122, the main CPU 123, the graphic processor 124, the first to the nth interfaces 125-1~125-n, and any other elements therein, may be connected to each other via the bus 126.

The first to nth interfaces 125-1 to 125-n are connected to the foregoing various components. One of the interfaces may be a network interface which is connected to an external device through a network.

The main CPU 123 accesses the storage 130 to perform booting using the operating system (O/S) stored in the storage 130. Further, the main CPU 123 performs various operations using various programs stored in the storage 130.

The ROM 122 stores a set of commands for system booting. If a turn on command is input and thus power is supplied, the main CPU 123 copies the O/S stored in the storage 130 to the RAM 121 and executes the O/S, according to the command stored in the ROM 122, thereby booting the system. If the booting is completed, the main CPU 123 copies various application programs stored in the storage 130 to the RAM 121 and executes the application programs copied to the RAM 121, thereby performing various operations.

The graphic processor 124 uses an operator (not illustrated) and a renderer (not illustrated) to create a screen including various objects such as an icon, an image, a text, and the like. Here, the operator may be a component for operating attribute values, such as coordinate values, forms, sizes, and colors by which each object is displayed, according to a layout of the screen, based on the received control command. The renderer may be a component for generating a screen of various layouts including an object based on the attribute values calculated by the operator. The screen created by the renderer may be displayed in a display region of the display 110.

The operation of the above-described processor 120 may be performed by a program stored in the storage 130.

The storage 130 stores various data such as an O/S software module to drive the user terminal apparatus 10, a contents reproduction module, a display UI module of various applications, and the like.

In this case, the processor 120 may process and display an input image based on information stored in the storage 130.

The user interface 140 receives various user interactions. Here, the user interface 140 may be implemented in various forms according to an embodiment of the user terminal apparatus 100. If the user terminal apparatus 100 is implemented as a digital television (TV), the user interface 140 may be realized as a remote control receiver which receives a remote control signal from a remote control apparatus, a camera which senses a user motion, a microphone which receives a user voice, and the like. Alternatively, if the user terminal apparatus 100 is implemented as a touch-based mobile terminal, the user interface 140 may be configured in the form of a touch screen having a layer structure with respect to a touch pad. In this case, the user interface 140 may be used as the above-described display 110.

The GPS chip 145 is an element to receive a GPS signal from a GPS satellite and calculate a current position of the user terminal device 1000. When it is necessary to use a navigation program or the current position of a user, the GPS chip 145 may calculate the user's position using the GPS chip 145.

The communicator 150 is an element to perform communication with various types of external devices according to various types of communication methods. The communicator 150 includes a Wi-Fi Chip 151, a Bluetooth chip 152, a wireless communication chip 153, a near field communication (NFC) chip 154, and the like. The processor 120 performs communication with various external devices using the communicator 150.

The Wi-Fi chip 151 and the Bluetooth chip 152 perform communication according to a Wi-Fi method and a Bluetooth method, respectively. When the Wi-Fi chip 151 or the Bluetooth chip 152 is used, a variety of connectivity information such as a service set identifier (SSID) and a session key may be transmitted and received first and communication is established using the connectivity information, and then a variety of information may be transmitted and received. The wireless communication chip 153 refers to a chip which performs communication according to various communication standards such as Institute of Electrical and Electronics Engineers (IEEE), ZigBee, $3^{rd}$ generation (3G), 3G partnership project (3GPP), long term evolution (LTE), and the like. The NFC chip 154 refers to a chip which operates in an NFC method using a band of 13.56 MHz from among various radio frequency identification (RF-ID) frequency bands such as 135 kHz, 13.56 MHz, 433 MHz, 860-960 MHz, 2.45 GHz, and the like.

The communicator 150 may perform unilateral communication or bilateral communication with respect to an electronic apparatus. When unilateral communication is performed, the communicator 150 may receive a signal from an electronic apparatus. When bilateral communication is performed, the communicator 150 may receive a signal from an electronic apparatus, and transmit a signal to an electronic apparatus.

The sensor 155 includes a touch sensor, a magnetic sensor, a gyro sensor, an acceleration sensor, a proximity sensor, a grip sensor, and the like. In addition to the above-described touch sensor, the sensor 155 may also sense various manipulations of the user terminal apparatus 100 such as rotation, tilt, pressure, approach, grip, and the like.

The touch sensor may be realized as a capacitive sensor or a resistive sensor. The capacitive sensor calculates touch coordinates by sensing micro-electricity excited by a user's body when part of the user's body touches a display screen using a dielectric coated on the display surface. The resistive sensor comprises two electrode plates embedded in the user terminal apparatus 100, and calculates touch coordinates as the upper and lower plates of the touched point contact each other to sense flowing electric current when a user touches a screen. In addition, an infrared detecting method, a surface acoustic wave method, an integral strain gauge method, a piezo electric method, and the like, may be used to detect a touch interaction.

In addition, the user terminal apparatus 100 may determine whether a touch object such as a finger or a stylus pen touches or approaches using a magnetic field sensor, an optical sensor, a proximity sensor, or the like, instead of a touch sensor.

The geomagnetic sensor detects the rotation state, the direction of motion, and the like, of the user terminal apparatus 100. The gyro sensor detects the rotation angle of the user terminal apparatus 100. The user terminal apparatus 100 may include both the geomagnetic sensor and the gyro sensor, but the user terminal apparatus 100 may detect the rotation state only with one of them.

The acceleration sensor detects the degree of tilt of the user terminal apparatus 100.

The proximity sensor detects a motion which is approaching a display surface without actually contacting the surface. The proximity sensor may be realized as various types of sensors such as an inductive proximity sensor which detects an electric current induced by magnetic field properties which change when an object approaches by forming a high frequency magnetic field, a magnetic proximity sensor which uses a magnet, and a capacitive proximity sensor which detects capacitance which changes as an object approaches.

The grip sensor is disposed on the rear side, border, or handle of the user terminal apparatus 100 separately from a touch sensor provided on a touch screen, and detects a user's grip. The grip sensor may be realized as a pressure sensor other than a touch sensor.

The audio processor 160 performs processing with respect to audio data. The audio processor 160 may perform various processing such as decoding, amplification, noise filtering, and the like, with respect to audio data.

The video processor 170 performs processing with respect to video data. The video processor 170 may perform various image processing such as decoding, scaling, noise filtering, frame rate conversion, resolution conversion, and the like, with respect to video data.

The speaker 180 outputs various audio data processed by the audio processor 160 and various notification sounds or voice messages, and the like.

The button 181 may be realized as various types of buttons such as a mechanical button, a touch pad, a wheel, and the like, which are formed on the front, side, and/or rear of the exterior of a main body.

The camera 182 photographs a still image or a moving image according to a user's control. The camera 182 may be realized as a plurality of cameras such as a front camera, a rear camera, and the like. In particular, the camera 182 may be used to photograph a motion of a subject to be controlled.

The microphone 183 receives a user voice or other sounds and converts the same into audio data.

Although not shown, the user terminal apparatus 100 may further include a universal serial bus (USB) port connectable to a USB connector, various external input ports for connecting to various external terminals such as a headset, a mouse, a local area network (LAN), a digital multimedia broadcasting (DMB) chip to receive and process a DMB signal, various sensors, and the like, depending on various embodiments.

Figure 2C:
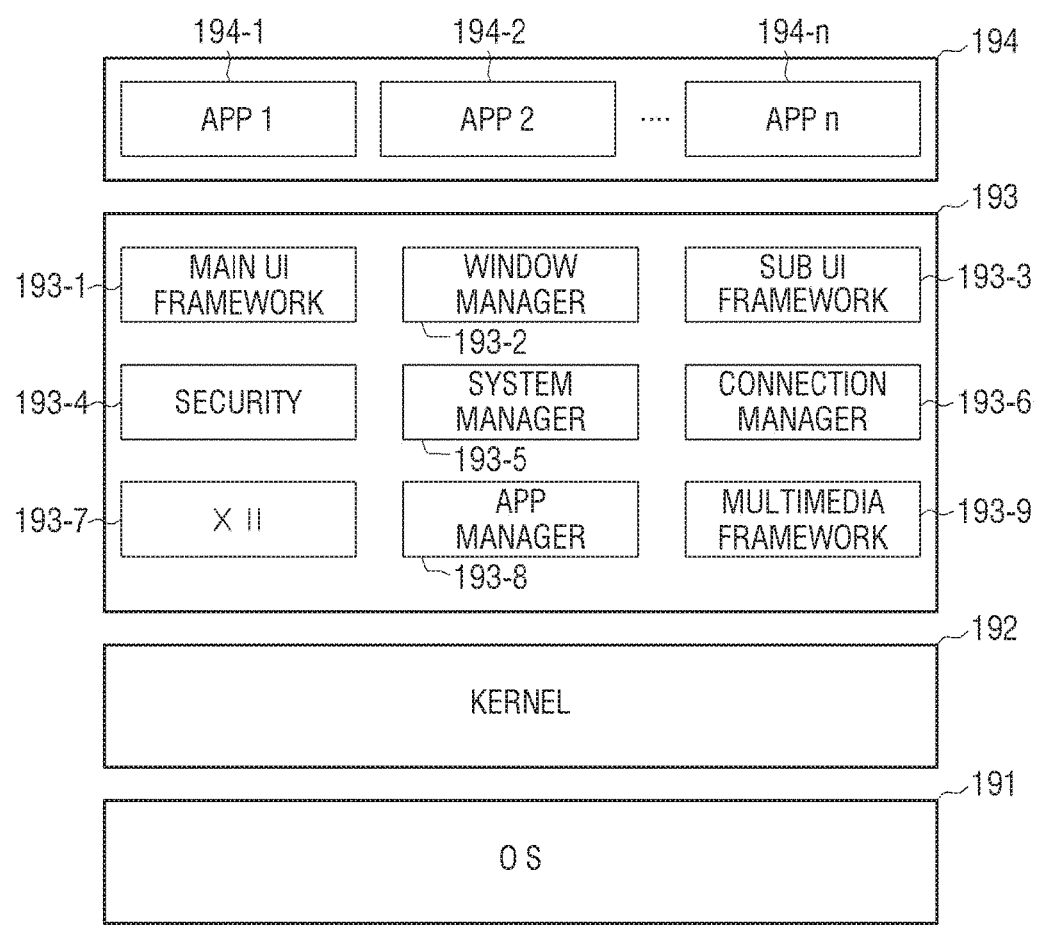
FIG. 2C is a block diagram illustrating various modules stored in a storage of a display apparatus according to an embodiment of the present disclosure.

FIG. 2C is a block diagram illustrating various modules stored in a storage according to an embodiment of the present disclosure.

Referring to FIG. 2C, software may be stored in the storage 130, but this is only an example. The software may be stored in various types of storage which is used in the user terminal apparatus 100 or which is accessible by the user terminal apparatus 100.

The user terminal apparatus 100 may store software including an O/S 191, a kernel 192, middleware 193, an application 194, and the like.

The O/S 191 controls and manages the overall operations of hardware. That is, the O/S 191 is responsible for management of hardware and basic functions such as memory, security, and the like.

The kernel 192 serves as a path through which various signals in addition to a touch signal, and the like, sensed by the display 110 are transferred to the middleware 193.

The middleware 193 includes various software modules for controlling the operations of the user terminal apparatus 100. The middleware 193 may include a main UI framework 193-1, a window manager 193-2, a sub UI framework 193-3, a security module 193-4, a system manager 193-5, a connection manager 193-6, an X11 module 193-7, an APP manager 193-8, and a multimedia framework 193-9.

The main UI framework 193-1 is a module for providing various UIs to be displayed on a main display area 10 of the display 110, and the sub UI framework 193-3 is a module for providing various UIs to be displayed on an auxiliary display area 20 and a round display area 30. The main UI framework 193-1 and the sub UI framework 193-3 may include an image compositor module configuring various objects, a coordinate compositor calculating coordinates at which objects are to be displayed, a rendering module rendering the configured objects at the calculated coordinates, a two dimensional (2D)/three dimensional (3D) UI toolkit providing a tool for configuring a 2D or 3D type of UI, and the like.

The window manager 193-2 may sense a touch event using a user's body or a pen or other input events. When the events are sensed, the window manager 193-2 transfers the event signal to the main UI framework 193-1 or the sub UI framework 193-3 to perform an operation corresponding to the event.

In addition, when the user touches and drags the screen, various program modules such as a handwriting module for drawing a line according to a drag trajectory, an angle calculation module for calculating a pitch angle, a roll angle, a yaw angle, and the like, based on sensor values sensed by the sensor may also be stored.

The security module 193-4 is a module for supporting certification, permission, secure storage for hardware, and the like.

The system manager 193-5 monitors a state of each component within the user terminal apparatus 100 and provides the results to other modules. For example, when a residual battery is insufficient, an error occurs, a communication connection is broken, and the like, the system manager 193-5 may provide the results to the main UI framework 193-1 or the sub UI framework 193-3 to output a notification message or a notification sound.

The connection manager 193-6 is a module for supporting a wired or wireless network connection. The connection manager 193-6 may include various detailed modules such as a DNET module, a universal plug and play (UPnP) module, and the like.

The X11 module 193-7 is a module for receiving various event signals from various hardware included in the user terminal apparatus 100. Here, the event may include various events such as an event where a user manipulation is sensed, an event where a system alarm is generated, an event where a specific program is executed or ended, and the like.

The APP manager 193-8 is a module for managing an execution state of various applications installed in the storage 130. When an application execution event is sensed from the X11 module 193-7, the APP manager 193-8 calls and executes an application corresponding to the event. That is, when an event where at least one object is selected is sensed, the APP manager 193-8 performs the operation of calling and executing an application corresponding to the object.

The multimedia framework 193-9 is a module for playing multimedia contents which are stored in the user terminal apparatus 100 or provided from external sources. The multimedia framework 193-9 may include a player module, a camcorder module, a sound processing module, and the like. Therefore, the multimedia framework 193-9 may perform an operation of playing various multimedia contents to generate and play a screen and a sound.

The application 194 includes first to nth applications 194-1~194-n.

The software structure illustrated in FIG. 2C is only an example, and therefore embodiments are not necessarily limited thereto. Therefore, some of the components may be omitted, changed, or added, if necessary. For example, the storage 130 may additionally store various programs such as a sensing module for analyzing signals sensed by various sensors, a messaging module like a short message service (SMS) and multimedia message service (MIMS), an e-mail program, a call info aggregator program module, a voice over Internet protocol (VoIP) module, a web browser module, and the like.

As described above, the user terminal apparatus 100 may be embodied as various types of apparatuses such as a mobile phone, a tablet personal computer (PC), a laptop PC, a personal digital assistant (PDA), a Moving Picture Experts Group phase 1 or phase 2 (MPEG-1 or MPEG-2) audio layer 3 (MP3) player, an e-album device, a TV, a PC, a kiosk, and the like. Accordingly, the configuration described above with reference to FIGS. 2B and 2C may be changed in various ways according to the type of user terminal apparatus 100.

As described above, the user terminal apparatus 100 may be configured in various forms and configurations.

Basic configuration and various embodiments will now be described in greater detail to help understanding of the present disclosure.

Figure 3:
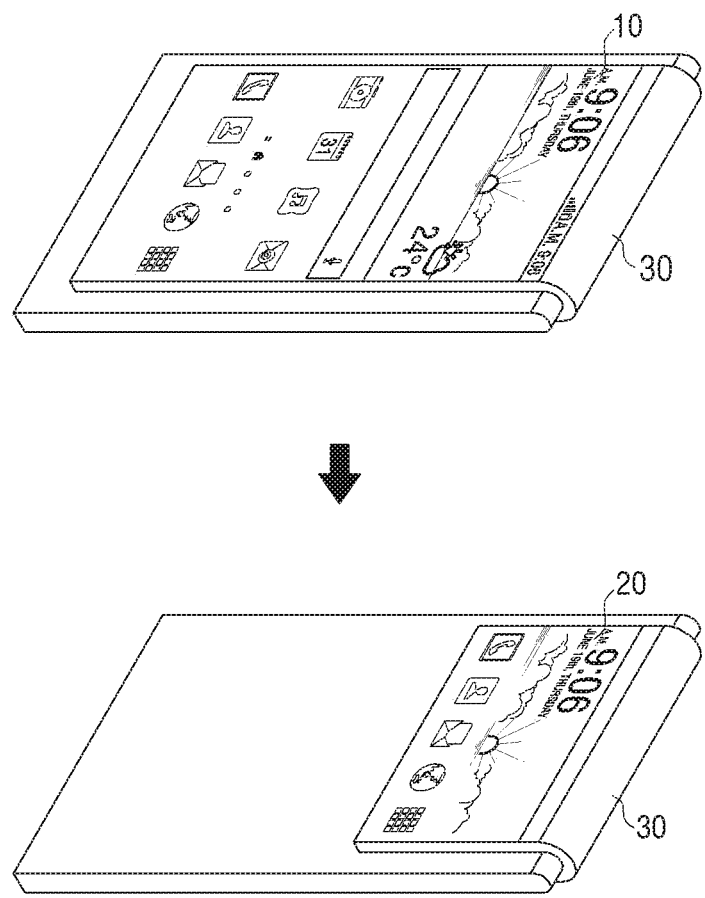
FIG. 3 is a view illustrating a display apparatus where only one of a main display area, a sub display area and a round display area is used according to an embodiment of the present disclosure.

FIG. 3 is a view illustrating a display apparatus where only one of a main display area, a sub display area and a round display area is used according to an embodiment of the present disclosure.

Referring to FIG. 3, the processor 120 may provide information to only one area from among the main display area 10 on the front side, the sub display area 20 on the rear side and the round display area 30. The processor 120 may determine an area where information is to be provided based on an orientation of the user terminal apparatus 100. If information is provided to one area, the processor 120 may not provide information to the other two areas.

If there is a user input pressing a power button, the processor 120 may perform the operation of determining the area where information is to be provided. Alternatively, if a call or a text message is received, the processor 120 may also perform the operation of determining the area where information is to be provided.

The area where information is to be provided is determined based on the orientation of the user terminal apparatus 100, but this is only an example. For example, if there is a user input pressing the power button, the processor 120 may recognize a user and provide information through an area which is close to the user's gaze. In this case, the information provided may vary according to an application which is executed.

The processor 130 may change the display area where information is to be provided using a user's touch input with respect to the area where information is not provided. For example, if the user input of touching one area of the sub display area 20 continuously is received while information is provided on the main display area 10, the information provided on the main display area 10 may be displayed on the sub display area 20.

The processor 120 may provide the same information differently depending on a display area. For example, as illustrated in FIG. 3, the processor 130 may change the layout of a home screen for each display area and display the home screen.

If the orientation of the user terminal apparatus 100 is changed, the processor 120 may change the area where information is provided. For example, if the user terminal apparatus 100 is rotated by more than a predetermined angle while a home screen is displayed on the main display area 10, the processor 130 may display the home screen on the sub display area 20.

In particular, if the orientation of the user terminal apparatus 100 is changed and the display area is changed, the processor 130 may change the layout of the information to be provided. If the area where information is to be provided is changed, the processor 120 may change not only an object, but also all of the size, contents, and layout of the object.

If the orientation of the user terminal apparatus 100 is changed and the display area is changed, the processor 120 may change the operation state of the application which is executed and provide the application on another display area. Alternatively, if the orientation of the user terminal apparatus 100 is changed, the processor 130 may divide the displayed information and display the divided information on other display areas.

Figure 4:
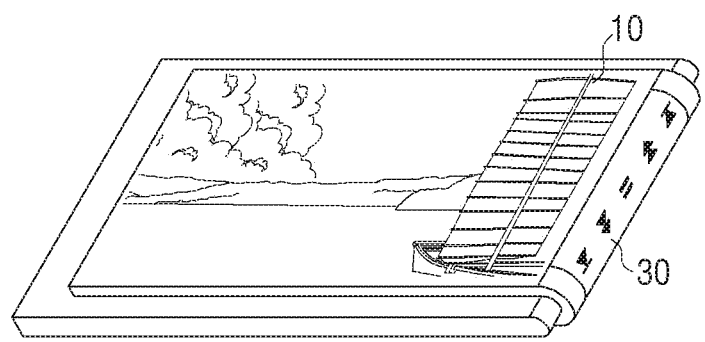
FIG. 4 is a view illustrating a display apparatus where at least two areas from among a main display area, a sub display area and a round display area are used according to an embodiment of the present disclosure.

FIG. 4 is a view illustrating a display apparatus where at least two areas from among a main display area, a sub display area and a round display area are used according to an embodiment of the present disclosure.

Referring to FIG. 4, the processor 120 may provide related information to two areas from among the main display area 10 of the front side, the sub display area 20 on the rear side and the round display area 30. For example, the processor 120 may display a video on the main display area 10 and display a UI for controlling the video on the round display area 30.

However, this is only an example, and the processor 120 may provide unrelated information to two areas from among the main display area 10, the sub display area 20 and the round display area 30.

If a call is received while a UI for controlling a video is displayed on the round display area 30 as illustrated in FIG. 4, the processor 120 may display a call receiving UI on the round display area 30, and move a UI for controlling the video to the sub display area 20 and display the UI.

If the call receiving UI is touched and the call is connected, a phone conversation UI may be displayed on the round display area 30 and the video may be played continuously. In this case, the processor 120 may mute the video. In addition, the processor 120 may pause the video.

The processor 120 may provide related information using all of the main display area 10, the sub display area 20 and the round display area 30. For example, the processor 120 may display a video on the main display area 10, display a UI for controlling the video on the sub display area 20, and display a UI indicating a video play time on the round display area 30.

Alternatively, the processor 120 may provide unrelated information using all of the main display area 10, the sub display area 20 and the round display area 30. The processor 120 may provide related information to two areas from among the main display area 10, the sub display area 20 and the round display area 30, and provide unrelated information to the remaining one area.

If the orientation of the user terminal apparatus 100 is changed, the processor 120 may change the display area of the information which is displayed on each area. In particular, the processor 120 may change the display area by combining or dividing information displayed on each area.

If a touch input is received on the sub display area 20, the processor 130 may display the UI displayed on the sub display area 20 on the main display area 10. Alternatively, if a touch input is received on the main display area 10, the processor 120 may display the UI displayed on the main display area on at least one of the sub display area 20 and the round display area 30.

Even if the same user input is received, the processor 130 may change the control level of a setting value depending on a touch area with respect to the same user touch input. For example, if a drag manipulation with respect to the main display area 10 or the sub display area 20 is input while a video is displayed on the main display area 10, the processor 120 may control the play time, the volume, and the like, according to the direction of the drag manipulation. In this case, the processor 120 may control the play time, the volume, and the like, more minutely when the drag manipulation is received on the sub display area 20 than when the drag manipulation is received on the main display area 10.

FIG. 4 is only an example, and embodiments of the present disclosure are not limited thereto. For example, the main display area 10, the sub display area 20 and the round display area 30 of FIG. 4 may be interchangeable. In addition, the operations of FIG. 4 may be applied to other applications.

Figure 5:
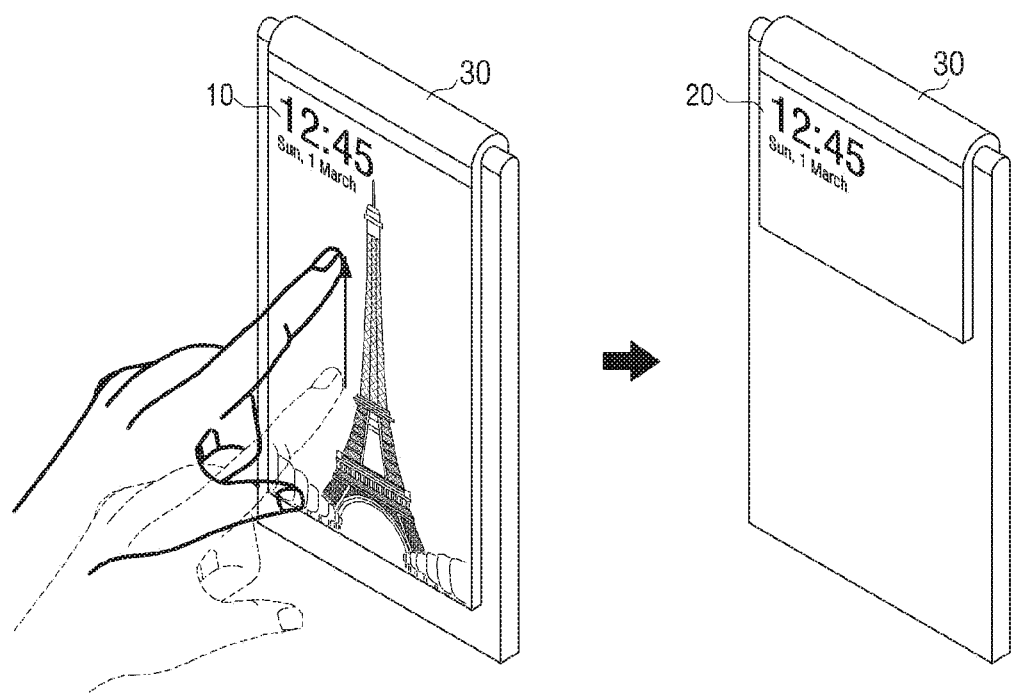
FIG. 5 is a view illustrating each area of a display apparatus and an example of an operation according to a touch input according to an embodiment of the present disclosure.

FIG. 5 is a view illustrating each area of a display apparatus and an example of an operation according to a touch input according to an embodiment of the present disclosure.

Referring to FIG. 5, if a drag input facing the round display area 30 is received on one area of the main display area 10, the information provided on the main display area 10 on the front side may be displayed on the sub display area 20 on the rear side.

The processor 120 may display the information provided on the main display area 10 on the sub display area 20 only when a drag input with more than a predetermined size is received.

If there is information provided on the sub display area 20 before a drag input is input, the processor 120 may not provide information which has been provided on the sub display area 20 any longer. In addition, the processor 120 may display the information that has been provided on the sub display area 20 on the main display area 10 or the round display area 30.

FIG. 5 illustrates a case where only the main display area 10 and the sub display area 20 are used, but this is only an example. For example, depending on the type of user input, the processor 120 may display information provided on at least one of the main display area 10 and the sub display area 20 on the round display area 30. Alternatively, the processor 120 may display information provided on the round display area 30 on one of the main display area 10 and the sub display area 20.

The processor 130 may receive a touch input even when it does not provide information to a specific area. For example, if the user input of dragging the round display area 30 is received while a broadcast content is displayed on the main display area 10, the processor 120 may change the channel or the volume of the broadcast content. In this case, no information may be provided on the round display area 30.

Hereinafter, a lock screen, a home screen, and a difference in function thereof will be described according to an embodiment. An example of a method of providing a lock screen will be first described, using FIGS. 6A to 6C.

Figure 6A:
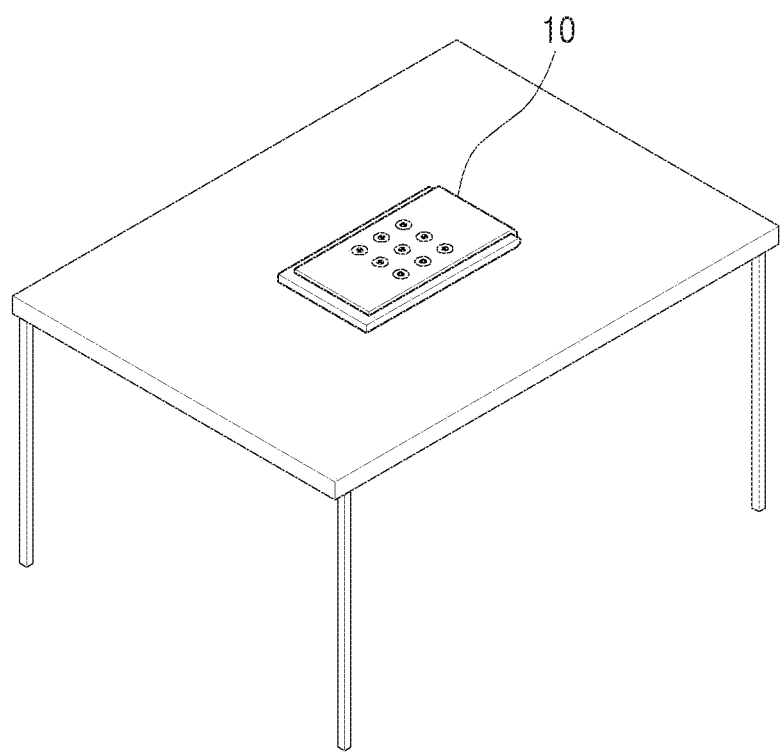
Figure 6B:
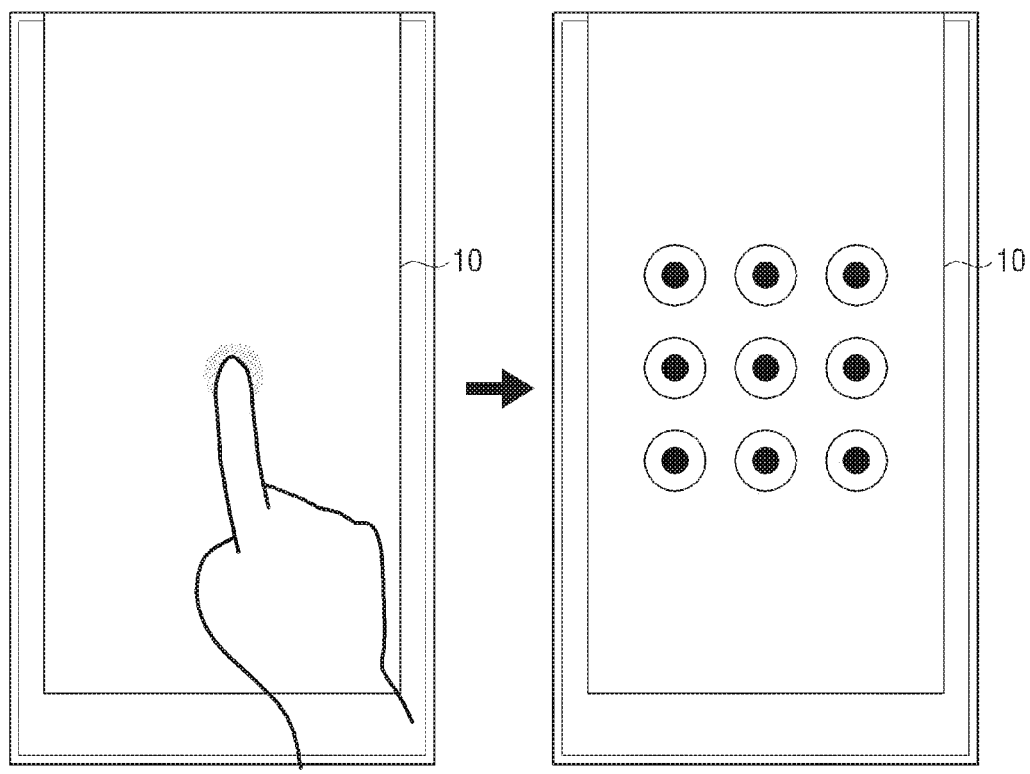

FIGS. 6A to 6C are views illustrating a display apparatus providing a lock screen according to various embodiments of the present disclosure.

If a predetermined event occurs in the user terminal apparatus 100, the processor 120 may sense the orientation of the user terminal apparatus 100. Here, the predetermined event includes not only a user's manipulation, but also all events where it is necessary to provide information to the display 110 such as the event of receiving a text message from outside.

The processor 120 may determine at least one display area to provide information from among the display area 10, the sub display area 20 and the round display area 30 based on the sensed orientation.

Referring to FIG. 6A, if a predetermined event occurs, the processor 120 may provide a lock screen on a display area which faces upward from among a plurality of display areas. The area to provide a lock screen may be set by a manufacturer or by a user.

Alternatively, the processor 120 may determine the display area to provide information based on the movement of the user terminal apparatus 100. For example, if the user terminal apparatus 100 is turned over, the processor 120 may provide a lock screen on a display area which faces upward from among a plurality of display areas. In addition, if the user terminal apparatus 100 is turned over and a touch interaction is sensed with respect to a display area which faces upward from among a plurality of display areas, the processor 120 may provide a lock screen on the corresponding display area.

Alternatively, if the user terminal apparatus 100 is turned over while one of a plurality of display areas is touched, the processor 120 may provide a lock screen on the touched display area. For example, if the user terminal apparatus 100 is turned over when the sub display area 20 is touched while information is provided on the main display area 10, the processor 120 may not provide information on the main display area 10 and provide information on the sub display area 20.

The processor 120 may receive a message while information is provided on the main display area 10 and provide notification on the main display area 10. In this case, if the user terminal apparatus 100 is turned over while the sub display area 20 is touched, the processor 120 may provide message contents on the sub display area 20.

In addition, the processor 120 may provide a lock screen on a display area which is touched after the user terminal apparatus 100 is turned over.

The processor 120 may determine the display area where a lock screen is provided in consideration of the type of event and the orientation of the user terminal apparatus 100.

Even if the main display area 10 on the front side faces upward, when there is a user's manipulation with respect to a power button, the processor 120 may display a lock screen on the main display area 10 and if a text message or the like is received, may display a lock screen on the round display area 30. Alternatively, if the sub display area 20 faces upward, the processor 120 may display a lock screen on the sub display area 20 according to a user's manipulation with respect to the power button.

The processor 120 may provide a lock screen on the display area where there is a user's touch manipulation.

Referring to FIG. 6B, if a knock-on interaction is sensed on the main display area 10 on the front side, the processor 120 may provide a lock screen on the main display area 10. If a knock-on interaction is sensed on the sub display area 20, the processor 120 may provide a lock screen on the sub display area 20. Here, the knock-on interaction refers to the interaction of touching one area of the display 110 twice in a row.

In addition, the processor 120 may determine the display area where a lock screen is provided based on the type of user interaction. For example, if a knock-on interaction is sensed, the processor 120 may provide a lock screen on the main display area 10, and if a swipe interaction is sensed, the processor 120 may provide a lock screen on the sub display area 20.

The processor 120 may divide each display area of the main display area 10, the sub display area 20 and the round display area 30, and determine the display area where a lock screen is provided based on the divided areas. For example, the processor 120 may divide the main display area 10 into three areas and map each area with the main display area 10, the sub display area 20 and the round display area 30. The processor 120 may provide a lock screen on a display area corresponding to an area where a user interaction is input on the main display area 10.

The processor 120 may determine the display area where a lock screen is provided according to a button manipulation on the user terminal apparatus 100.

Referring to FIG. 6C, if a power button 610 is manipulated, the processor 120 may provide a lock screen on the main display area 10 on the front side, and if a home button 620 is manipulated, the processor 120 may provide a lock screen on the sub display area 20 on the rear side.

Alternatively, the processor 120 may determine the display area where a lock screen is provided based on the number of button manipulations. For example, if the power button 610 is manipulated once, the processor 120 may provide a lock screen on the main display area 10, and if the power button 610 is manipulated twice in a row, the processor 120 may provide a lock screen on the sub display area 20.

If the power button 610 is manipulated while information is provided on the main display area 10, the processor 120 may not provide information any longer, and if the power button 610 is manipulated once more, the processor 120 may provide information on the sub display area 20.

In addition, the processor 120 may determine the display area where a lock screen is provided using a volume button (not illustrated). Alternatively, the processor 120 may determine the display area where a lock screen is provided by combining manipulates of a plurality of buttons.

FIGS. 6A to 6C illustrate that a lock screen is provided, but this is only an example. For example, if a lock screen function is not set on the user terminal apparatus 100, a home screen may be immediately provided.

In addition, the display area where a lock screen is provided may be predetermined. In this case, when an event occurs, the processor 120 may provide a lock screen on the predetermined display area.

Further, when an event occurs, a lock screen may be provided on the display area where information is last provided. For example, if the round display area 30 only is used and turned off, when an event occurs, a lock screen may again be provided to the round display area 30.

In addition, the processor 120 may determine the display area where a lock screen is provided by combining the embodiments of FIGS. 6A to 6C. In other words, the processor 120 may determine the display area where a lock screen is provided by combining at least two of the orientation of the user terminal apparatus 100, a user interaction and a button manipulation with respect to the display 110.

FIGS. 6A to 6C illustrate that a lock screen is provided on one display area, but this is only an example. For example, the processor 120 may determine a plurality of display areas where a lock screen is provided based on at least one of the orientation of the user terminal apparatus 100, a user interaction and a button manipulation with respect to the display 110.

Figure 7A:
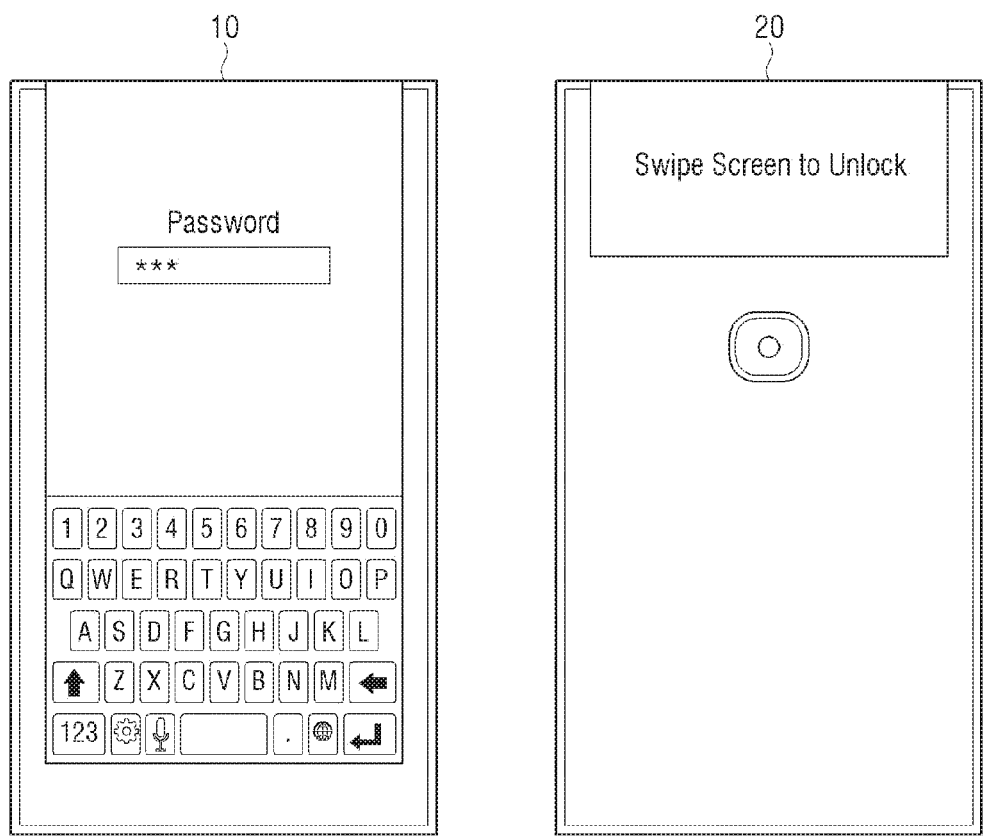
Figure 7B:
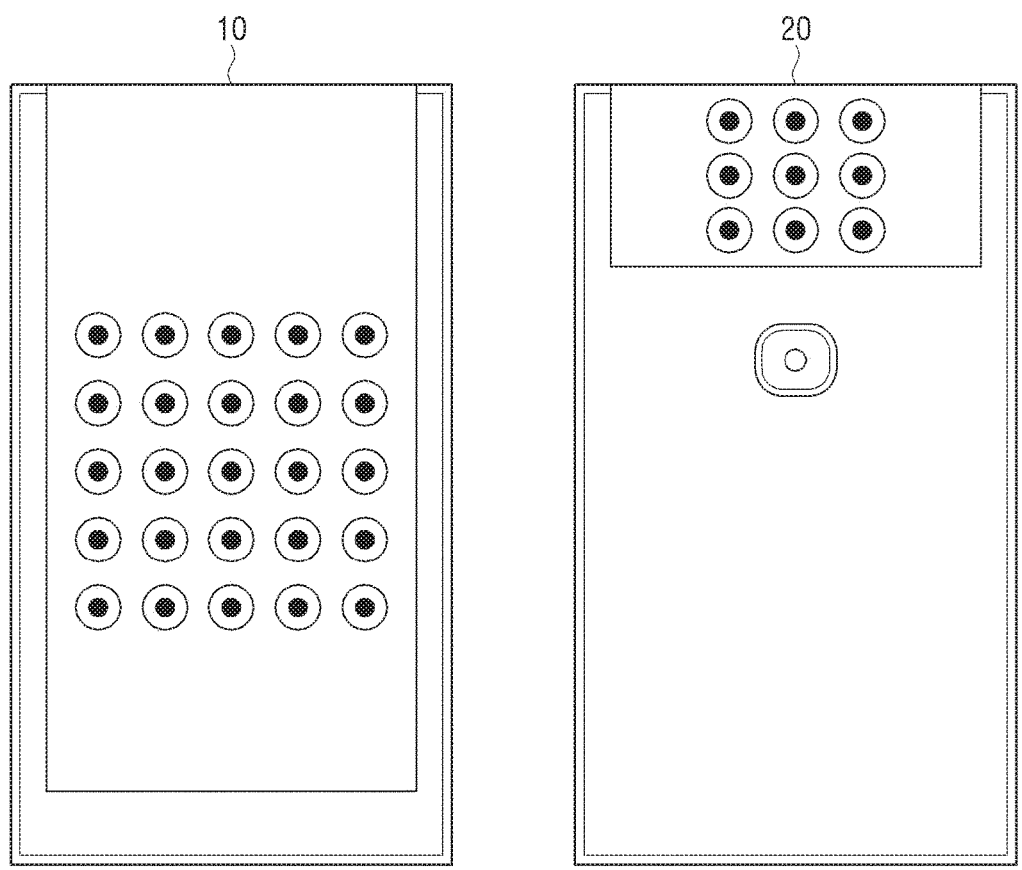

FIGS. 7A to 7C are views illustrating a type of a lock screen and a layout according to a display area of a display apparatus according to various embodiments of the present disclosure.

The lock screen may be one of a swipe lock screen, a biometric information lock screen, a pattern lock screen, a PIN lock screen, and a password lock screen, and may include other types of lock screens. If the lock screen is released, the processor 120 may provide a home screen.

The processor 120 may determine the type of lock screen based on the display area where a lock screen is provided. For example, if an event occurs and a lock screen is provided on the main display area 10, the processor 120 may provide one of a biometric information lock screen, a password lock screen, a pattern lock screen, a PIN lock screen, and a swipe lock screen on the main display area 10. However, if an event occurs and a lock screen is provided on the round display area 30, the processor 120 may provide only a swipe lock screen on the round display area 30 because it is difficult to provide other lock screens to the round display area 30 due to its small size.

In particular, if the processor 120 provides a lock screen on a plurality of display areas, the processor 120 may determine the type of lock screen based on the display area where the lock screen is provided.

Referring to FIG. 7A, if the lock screen of the user terminal apparatus 100 is set to a password lock screen, the processor 120 may provide a password lock screen on the main display area 10 on the front side and provide a swipe lock screen on the sub display area 20 on the rear side since the sizes of the display areas are different from one another.

In addition, if the processor 120 provides a lock screen on a plurality of display areas, the processor 120 may change the layout of the lock screen based on the area where the lock screen is provided.

Referring to FIG. 7B, if the lock screen of the user terminal apparatus 100 is set to a pattern lock screen, the processor 120 may provide a pattern lock screen of 5×5 on the main display area 10 on the front side and provide a pattern lock screen of 3×3 on the sub display area 20 on the rear side. In this case, the user terminal apparatus 100 may require two types of passwords, 5×5 and 3×3, when setting patterns and store the passwords, but embodiments are not limited thereto.

In addition, the processor 120 may provide a plurality of lock screens on a single display area. In particular, the processor 120 may provide a plurality of lock screens on the main display area 10, and may provide different home screens based on the type of lock screen which is released.

Referring to FIG. 7C, the processor 120 may provide a pattern lock screen on the upper part of the main display area 10 on the front side, and may also provide a swipe lock screen on the lower part of the main display area 10.

The processor 120 may determine the display area where a home screen is provided based on the type of lock screen which is released. For example, if a fingerprint is recognized through a home button 710, the processor 120 may provide a home screen on the main display area 10, if a pattern lock screen is released, the processor 120 may provide a home screen on the sub display area 20, and if a swipe lock screen is released, the processor 120 may provide a home screen on the round display area 30. A description regarding a home screen is provided in greater detail below.

The user terminal apparatus 100 may also store information regarding the difficulty of a lock screen. For example, the user terminal apparatus 100 may store information regarding the difficulty of lock screens in a descending order of a biometric information lock screen, a password lock screen, a pattern lock screen, a PIN lock screen, and a swipe lock screen. However, this is only an example, and the order of difficulty may be set in various ways. In addition, as described above, the same type of lock screens may be configured to have various levels of difficulty.

The processor 120 may determine the difficulty of a lock screen based on the display area where a lock screen is provided. For example, the processor 120 may provide a lock screen with a relatively low level of difficulty to the sub display area 20 or the round display area 30 in comparison with the difficulty of a lock screen provided to the main display area 10.

Figure 8A:
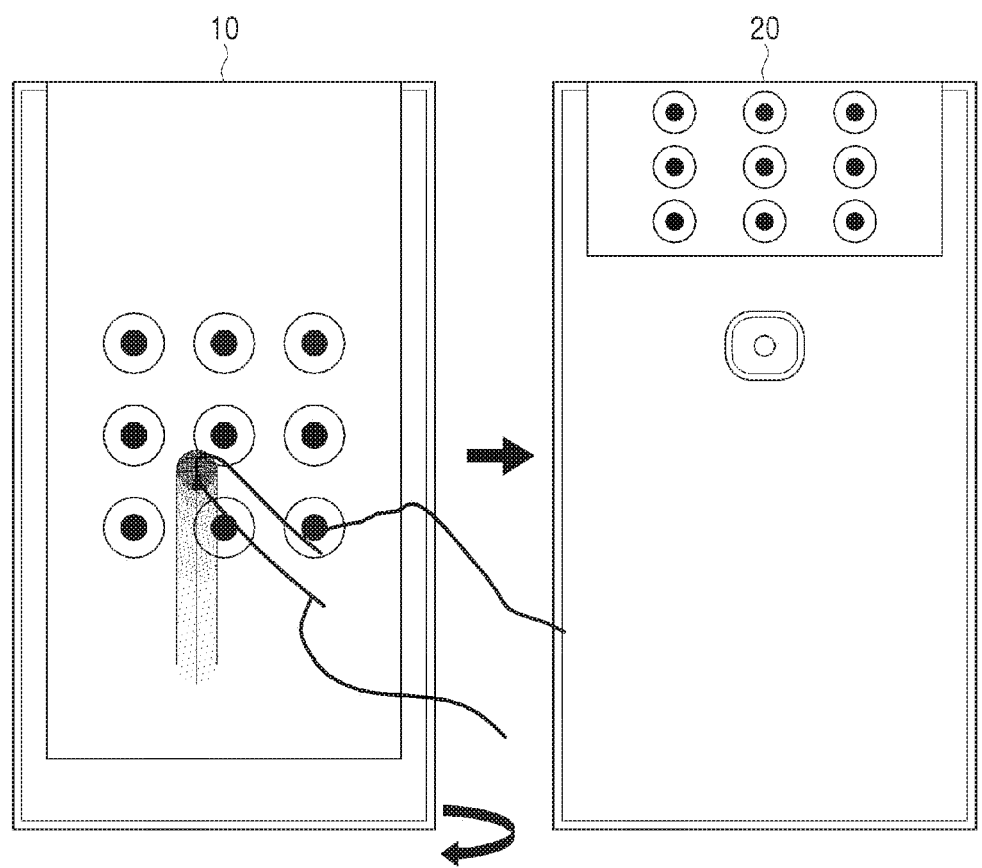
FIGS. 8A and 8B are views illustrating a display apparatus where a lock screen of a main display area is identical to a lock screen of a sub display area according to various embodiments of the present disclosure.
Figure 8B:
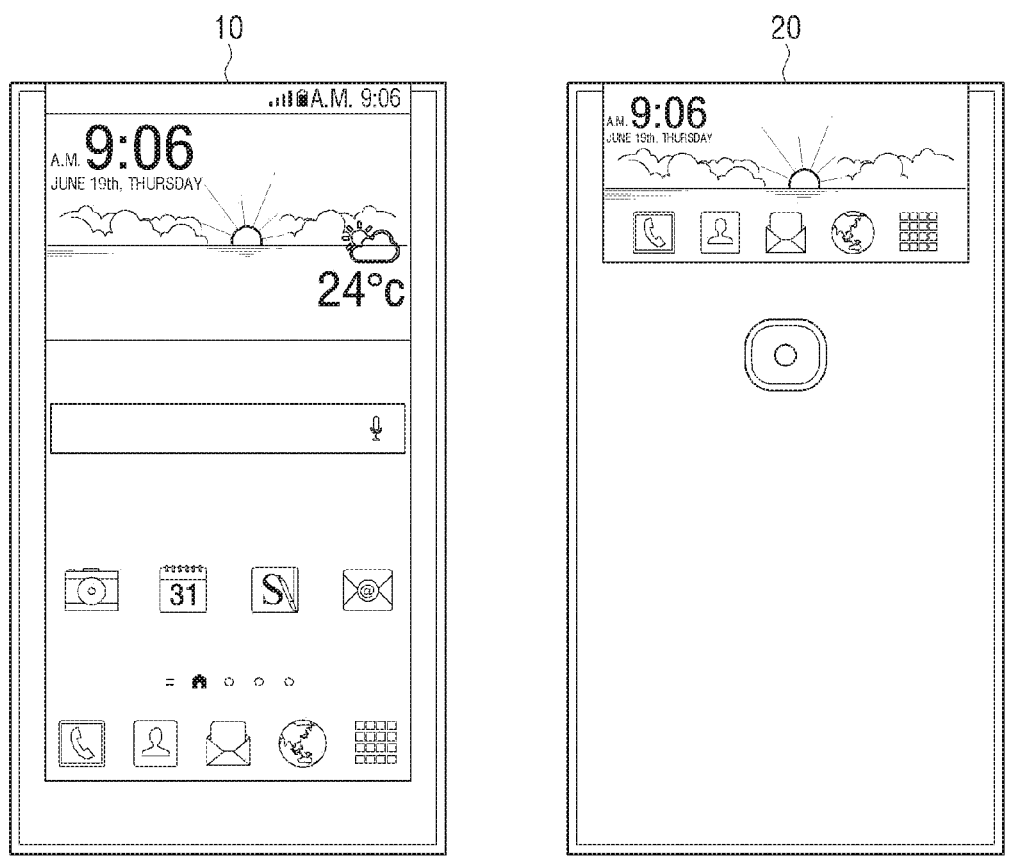

FIGS. 8A and 8B are views illustrating a display apparatus where a lock screen of a main display area is identical to a lock screen of a sub display area according to various embodiments of the present disclosure.

The processor 120 may provide a lock screen on at least one of the main display area 10 on the front side and the sub display area 20 on the rear side.

Referring to FIG. 8A, while a pattern lock screen is provided on the main display area 10 on the front side, the processor 120 may also provide a pattern lock screen on the sub display area 20 on the rear side by the operation of turning over the user terminal apparatus 100, or the operation of touching one area of the main display area 10 and dragging the touched area in the upper direction of the user terminal apparatus 100. In particular, the processor 120 may provide a pattern lock screen in the same type and layout as the pattern lock screen provided on the main display area 10 to the sub display area 20. Alternatively, the processor 120 may initially provide the same pattern lock screen on the main display area 10 and the sub display area 20.

However, if it is difficult to provide the same lock screen on the sub display area 20, the processor 120 may change the type and layout of the lock screen and provide the changed lock screen. In particular, when a changed lock screen is provided, the processor 120 may change the difficulty of the lock screen. For example, while a password lock screen is provided on the main display area 10, the processor 120 may provide a lock screen with a lower level of difficulty than the password lock screen to the sub display area 20 by the operation of turning over the user terminal apparatus 100, or the operation of touching one area of the main display area 10 and dragging the touched area in the upper direction of the user terminal apparatus 100.

Alternatively, while a PIN lock screen is provided, the processor 120 may provide a lock screen with a higher level of difficulty than the PIN lock screen to the main display area 10 by the operation of turning over the user terminal apparatus 100, or the operation of touching one area of the sub display area 20 and dragging the touched area in the upper direction of the user terminal apparatus 100. The state where a different lock screen is provided to the main display area 10 and the sub display area 20 will be described in greater detail below.

If the same lock screen is provided on the main display area 10 and the sub display area 20, and one of the lock screens is released, the processor 120 may determine the display area where a home screen is provided based on the direction of the user terminal apparatus 100 or the display area where the lock screen is released.

For example, as illustrated in FIG. 8A, if the lock screen is released on the main display area 10 on the front side, a home screen may be provided on the main display area 10 on the front side as illustrated in FIG. 8B.

Alternatively, as illustrated in FIG. 8A, if the lock screen is released on the sub display area 20 on the rear side, a home screen may be provided on the sub display area 20 on the rear side as illustrated in FIG. 8B.

If the user terminal apparatus 100 faces upward when the lock screen is released, the processor 120 may provide a home screen on the display area 10 which faces upward.

In this case, the processor 120 may provide access rights and all authorities regarding all applications provided by the user terminal apparatus 100. However, as illustrated in FIG. 8B, the processor 120 may change and provide a home screen based on the size of the sub display area 20. In this case, the processor 120 may also provide access rights and all authorities regarding all applications provided by the user terminal apparatus 100.

Figure 9A:
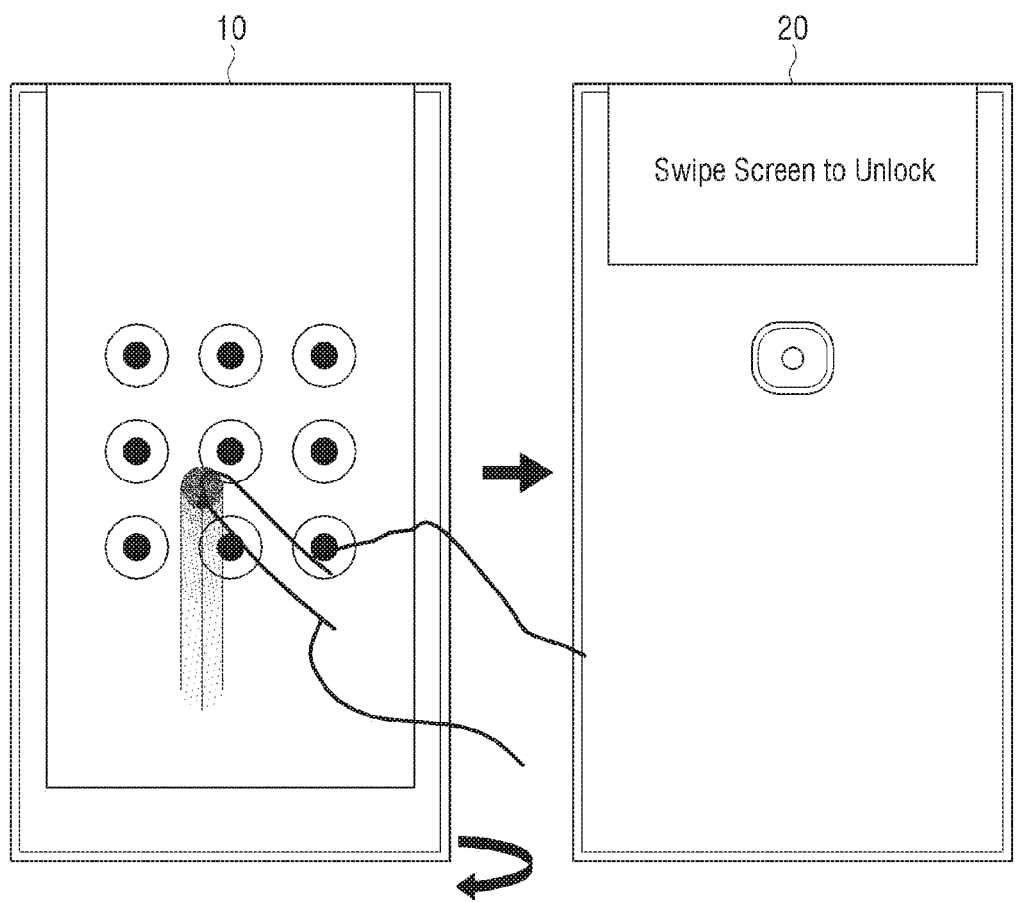
FIGS. 9A and 9B are views illustrating a display apparatus where a lock screen of a main display area is different from a lock screen of a sub display area according to various embodiments of the present disclosure.
Figure 9B:
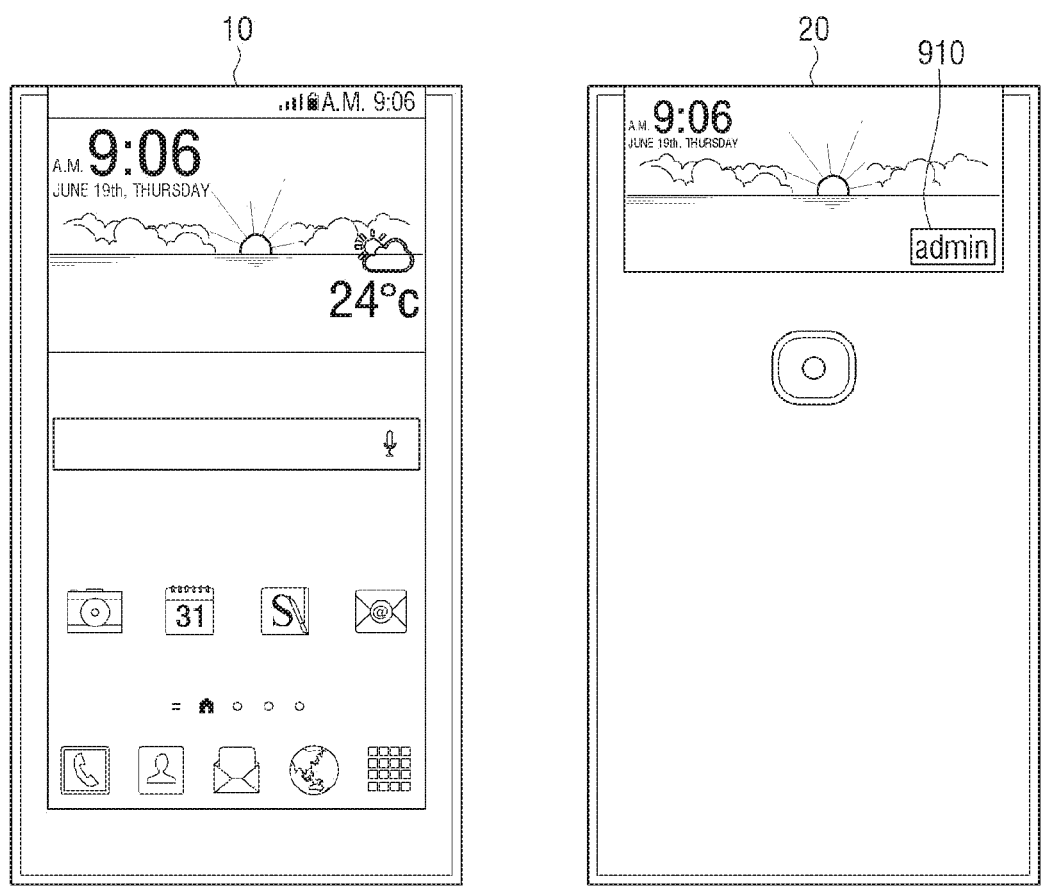

FIGS. 9A and 9B are views illustrating a display apparatus where a lock screen of a main display area is different from a lock screen of a sub display area according to various embodiments of the present disclosure.

Referring to FIG. 9A, the processor 120 may provide a different lock screen on the main display area 10 on the front side and the sub display area 20 on the rear side. The case where a different lock screen is provided has been described above with reference to FIG. 8A, so further description will not be provided.

While a different lock screen is provided on the main display area 10 and the sub display area 20, and one of the lock screens is released, the processor 120 may provide a different home screen based on the released lock screen.

Referring to FIG. 9A, if the lock screen of the main display area 10 on the front side is released, the processor 120 may provide access rights and all authorities regarding all applications provided by the user terminal apparatus 100 on the main display area 10 on the front side as illustrated in FIG. 9B.

While all authorities are provided, the processor 120 may provide a home screen on the sub display area 20 by the operation of turning over the user terminal apparatus 100, or the operation of touching one area of the main display area 10 and dragging the touched area in the upper direction of the user terminal apparatus 100. In this case, the processor 120 may provide access rights and all authorities regarding all applications provided by the user terminal apparatus 100 through the home screen of the sub display area 20.

If the lock screen of the sub display area 20 on the rear side which has a lower level of difficulty than the lock screen of the main display area 10 is released as illustrated in FIG. 9A, the processor 120 may provide access rights and some authorities regarding some of the applications provided by the user terminal apparatus 100 on the sub display 20 on the rear side as illustrated in FIG. 9B.

FIG. 9B illustrates time information and weather information only, but this is only an example. For example, the processor 120 may provide a phone call application which is capable of receiving calls only.

That is, the processor 120 may configure a home screen differently depending on a released lock screen. In particular, the processor 120 may determine at least one of the type and the authorities of the applications which are to be provided on the home screen based on the display area where a user input is sensed.

Even if there is the operation of turning over the user terminal apparatus 100 or the operation of touching one area of the main display area 10 and dragging the touched area in the upper direction of the user terminal apparatus 100, the processor 120 does not change authorities. That is, the processor 120 may move the home screen of the sub display area 20 to the main display area 10, but the authorities may be still restricted.

However, this is only an example, and when the home screen of the sub display area 20 is moved and provided on the main display area 10, the processor 120 may provide a lock screen for changing the authorities.

Alternatively, while some authorities are restricted, the processor 120 may provide a home screen only on the sub display area 20 and may not provide information on the main display area 10. For example, while some authorities are restricted, the processor 120 may not move the home screen to the main display area 10 even if there is the operation of turning over the user terminal apparatus 100, or the operation of touching one area of the main display area 10 and dragging the touched area in the upper direction of the user terminal apparatus 100.

The processor 120 may also include a GUI 910 for providing manager authorities in a home screen and display the home screen on the sub display area 20 on the rear side. A user may change at least one of the type of application and the authorities of the application using the GUI 910.

While some of the authorities are restricted, the processor 120 may provide a lock screen with a high level of difficulty by the operation of turning over the user terminal apparatus 100, the operation of touching one area of the main display area 10 and dragging the touched area in the upper direction of the user terminal apparatus 100, or the operation of touching the GUI 910. In this case, the processor 120 may provide the lock screen with a high level of difficulty on the main display area 10.

If the lock screen with a high level of difficulty is released, the processor 120 may change the home screen and provide access rights and all authorities regarding all applications provided by the user terminal apparatus 100.

FIGS. 8A to 9B illustrate a display apparatus where the main display area 10 and the sub display area 20 are used, but the same descriptions and operations are equally applicable with respect to the round display area 30. For example, a swipe lock screen may be provided on the round display area 30, and when the lock screen is released, only minimum functions may be provided.

Figure 10A:
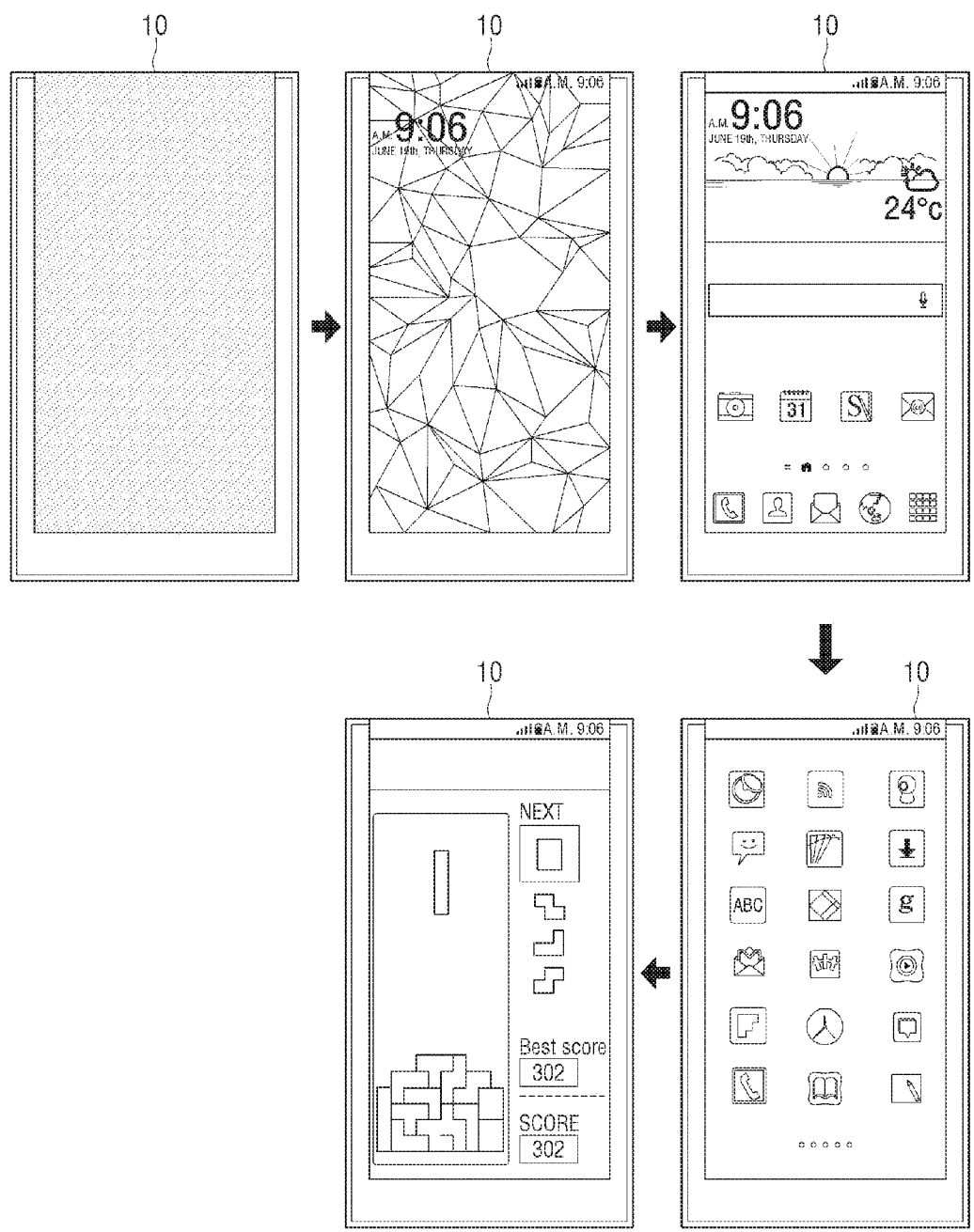
FIGS. 10A and 10B are views illustrating a home screen of a display apparatus according to various embodiments of the present disclosure.
Figure 10B:
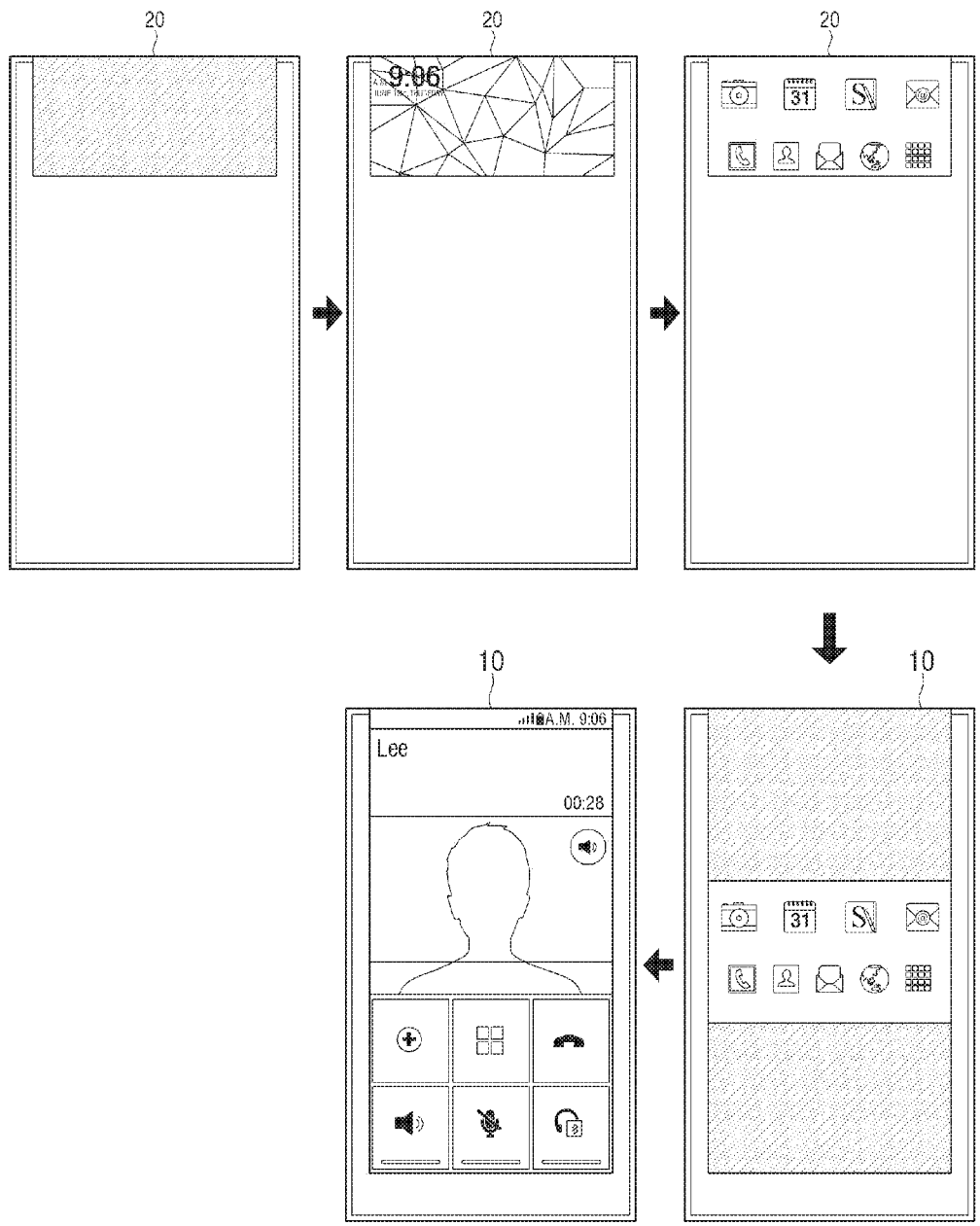

FIGS. 10A and 10B are views illustrating a home screen of a display apparatus according to various embodiments of the present disclosure.

Referring to FIG. 10A, the processor 120 may configure a home screen based on a released lock screen. The processor 120 may determine at least one of the type and the authorities regarding applications which are to be included in the home screen based on a level of difficulty of the released lock screen. Here, the level of difficulty of the lock screen may be determined based on at least one of the type and the layout of the lock screen. However, FIGS. 10A and 10B illustrate that the operation is performed based on the display area where a swipe lock screen is released for convenience of explanation.

If the lock screen is released through the main display area 10 on the front side, the processor 120 may provide a home screen where all applications can be executed on the main display area 10. In addition, the processor 120 may provide not only the home screen, but also a menu screen where all applications can be checked, and execute all of the selected applications.

Referring to FIG. 10B, if the lock screen is released through the sub display area 20, the processor 120 may provide a home screen including some predetermined applications on the sub display area 20 on the rear side.

Even if the home screen provided on the sub display area 20 is then moved to the main display area 10 on the front side according to a user manipulation, the home screen may not be changed and the predetermined applications may not be changed either. The processor 120 may execute only the predetermined applications.

In particular, the processor 120 may provide only specific functions of the predetermined applications. For example, if a camera application is executed, the processor 120 may provide only a photographing function and may limit the existing function of viewing captured photos.

Here, the predetermined applications may be set by a manufacturer, or may be set by a user.

Figure 11A:
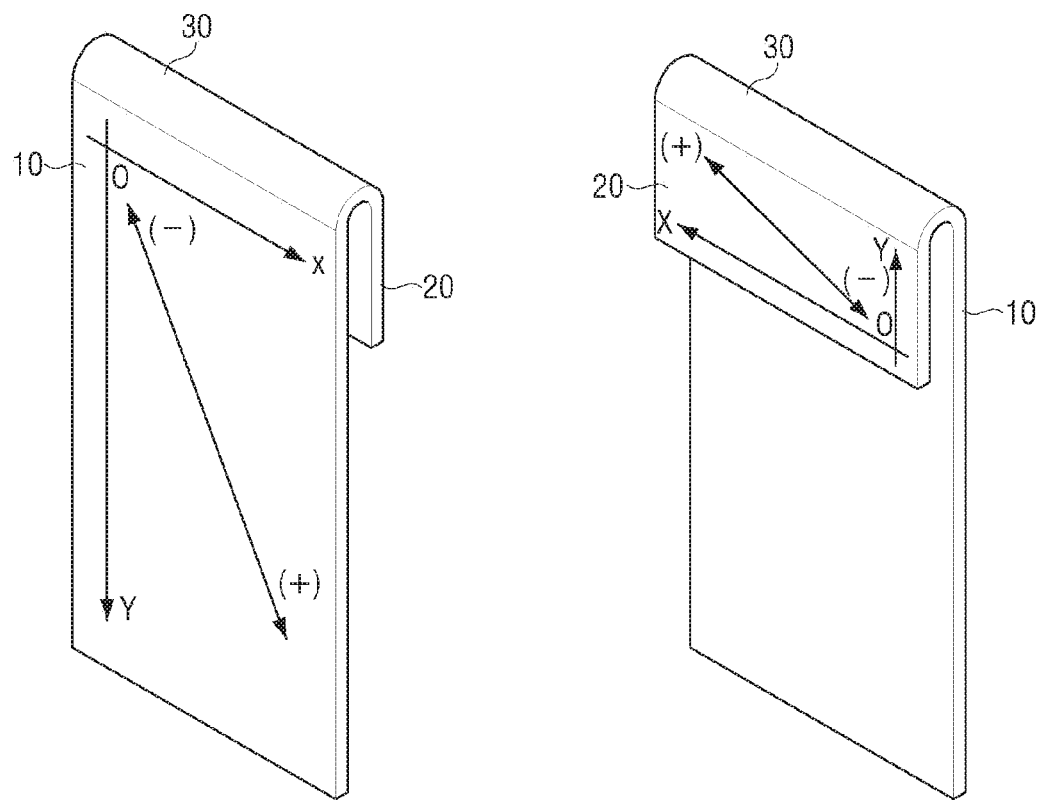
FIGS. 11A to 11C are views illustrating a method of recognizing a touch input of a display apparatus according to various embodiments of the present disclosure.
Figure 11B:
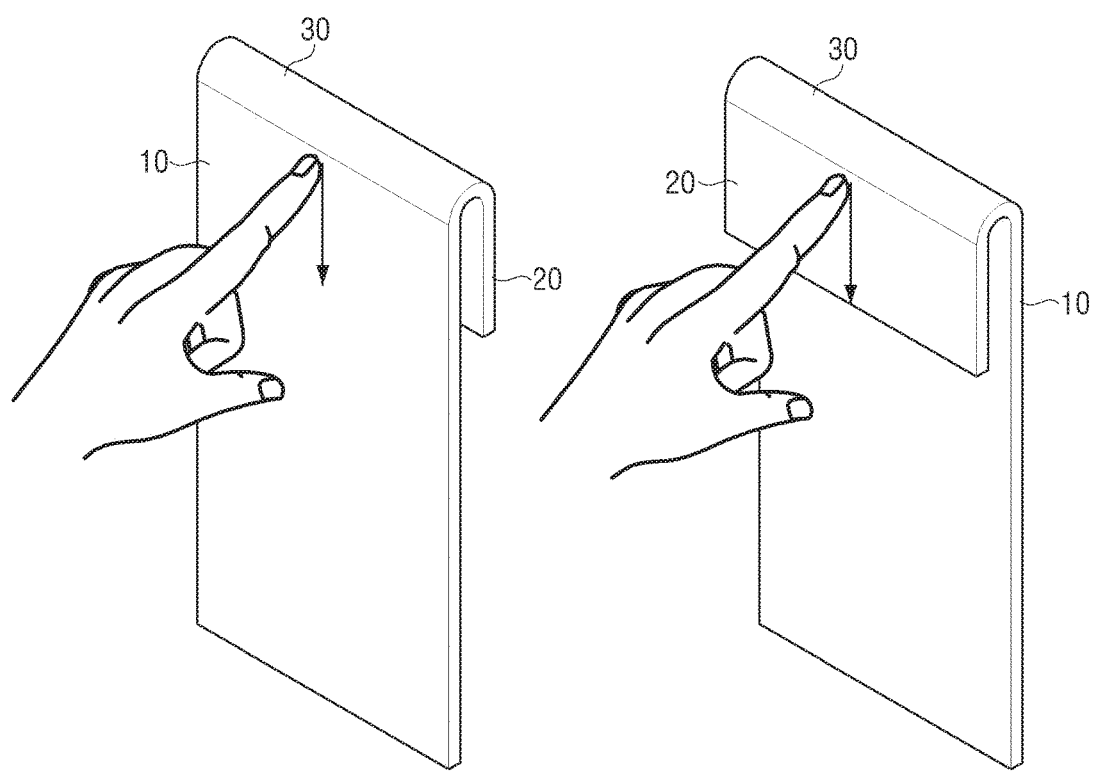
Figure 11C:
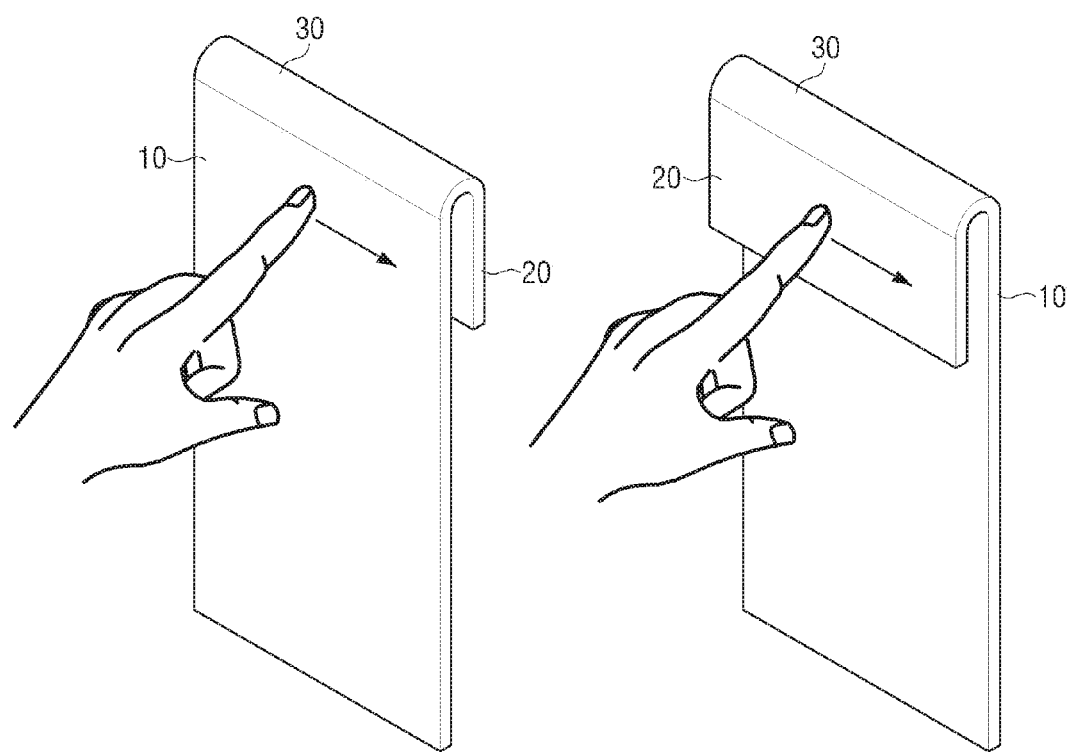

FIGS. 11A to 11C are views illustrating a method of recognizing a touch input of a display apparatus according to various embodiments of the present disclosure.

Referring to FIG. 11A, a standard for sensing a touch input of the display 110 is illustrated. For illustrative purposes regarding the main display area 10 on the front side, a higher positive value is assigned as a touch input moves from the left side to the right side of the main display area 10, and a higher positive value is assigned as a touch input moves to the lower side from the upper side on the main display area 10 of the display 110. Regarding the sub display area 20 on the rear side, a higher positive value is assigned as a touch input moves from the right side to the left side of the sub display area 20, and a higher positive value is assigned as a touch input moves to the upper side from the lower side on the sub display area 20 of the display 110. Accordingly, a problem may occur if a user wishes to control a UI of the sub display area 20 which is displayed on the main display area 10 while watching the main display area 10. Such a problem occurs as one touch panel is used, and the coordinate values are reversed as the touch panel is bent over the round display area 30.

Referring to FIG. 11B, a view is provided illustrating a problem which may occur due to a touch input in the up and down direction. As illustrated in FIG. 11B, if a touch input on the main display area 10 of a front side is sensed as having the same direction on the sub display area 20 on the rear side, the processor 120 may execute a function corresponding to the touch input by recognizing the direction of the received touch input reversely.

Below is a case where a user controls a UI of the sub display area 20 displayed on the main display area while watching the main display area 10. If a touch input in the lower direction of the sub display area 20 is received, the processor 120 may determine that a value is decreasing with respect to the axis Y. In this case, the processor 120 may display a GUI displayed on the main display area such that the value is increasing with respect to the axis Y.

Referring to FIG. 11C, a view is provided illustrating a problem which may occur due to a touch input in the left and right direction. As illustrated in FIG. 11C, if a touch input on the main display area 10 on the front side is sensed with respect to the direction of the axis X as having the same direction on the sub display area 20 on the rear side, the processor 120 may execute a function corresponding to the touch input by again recognizing the direction of the received touch input reversely.

Below is a case where a user controls a UI of the sub display area 20 displayed on the main display area 10 while watching the main display area 10. If a touch input in the right direction of the sub display area 20 is received, the processor 120 may determine that a value is decreasing with respect to the axis X. In this case, the processor 120 may display a GUI displayed on the main display area 10 such that the value is increasing with respect to the axis X. However, this is only an example, and there may be various GUIs provided to the user. In addition, the GUIs may be set by a user.

Figure 12A:
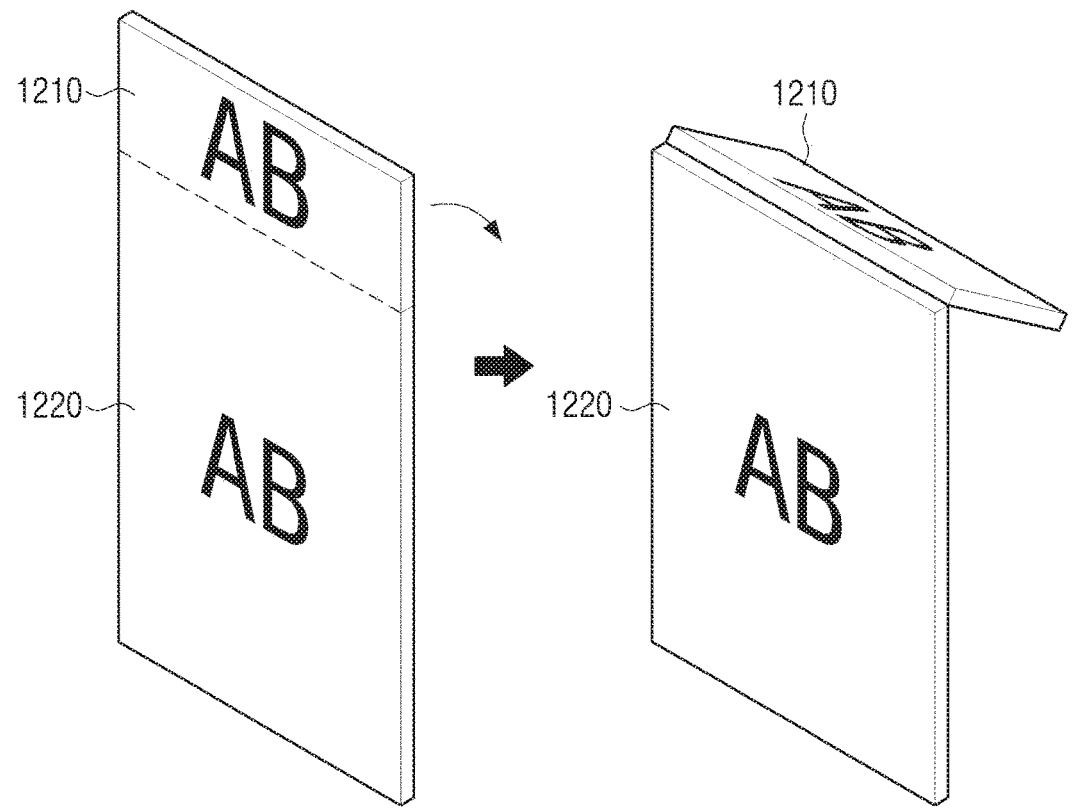
FIGS. 12A and 12B are views illustrating a configuration of a display of a display apparatus according to various embodiments of the present disclosure.
Figure 12B:
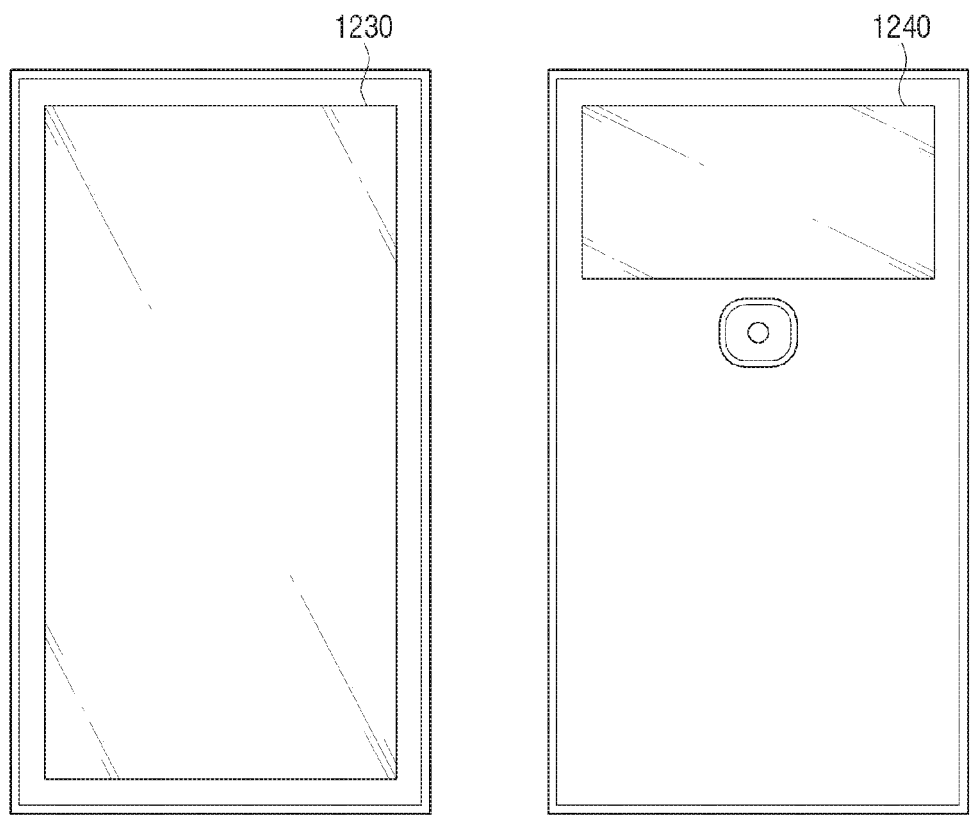

FIGS. 12A and 12B are views illustrating a configuration of a display of a display apparatus according to various embodiments of the present disclosure.

Referring to FIG. 12A, a flexible display is illustrated. A user may use a flexible display by folding or otherwise bending the flexible display. In this case, the flipped area after being folded corresponds to the sub display area 20 on the rear side, and the unfolded area corresponds to the main display area 10 on the front side. If a touch input is received on a folded and flipped area 1210, the flexible display may display a UI, displayed on the folded and flipped area 1210, on an unfolded area 1220.

FIG. 12A illustrates that the flipped area 1210 is larger than the unfolded area 1220, but this is only an example. For example, a user may fold a flexible display exactly by half and use the flexible display.

The above embodiments, except those provided with the round display area 30, are applicable to a flexible display as illustrated in FIG. 12A and thus, duplicate descriptions thereof will not be provided. However, if a flexible display is folded twice and thus, a round display area is formed, the above described embodiment may also be applied to the round display area.

Referring to FIG. 12B, a user terminal apparatus is illustrated having a plurality of displays on the front and rear sides. In this case, a front display 1230 corresponds to the main display area 10 on the front side, and a rear display 1240 corresponds to the sub display area 20 on the rear side. Likewise, the above embodiments, except those provided with the round display area 30, are applicable to a user terminal apparatus as illustrated in FIG. 12B having a plurality of displays on the front and rear sides and thus, duplicate descriptions thereof will not be provided.

Figure 13:
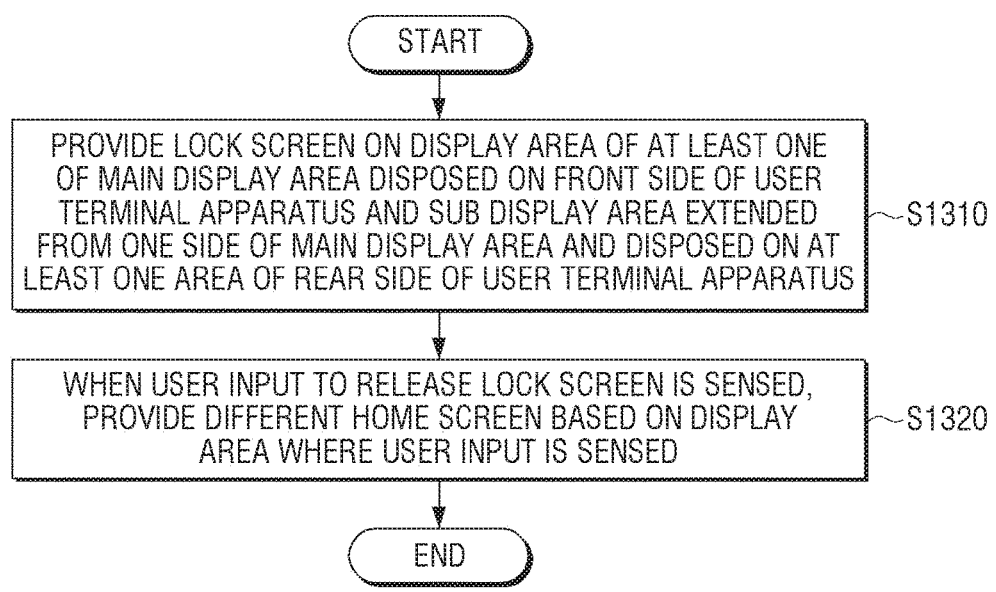
FIG. 13 is a flowchart of a controlling method of a user terminal apparatus according to an embodiment of the present disclosure.

FIG. 13 is a flowchart of a controlling method of a user terminal apparatus according to an embodiment of the present disclosure.

Referring to FIG. 13, a lock screen is provided on at least one display area of a main display area which is disposed on a front side of the user terminal apparatus and a sub display area which is extended from the main display area and disposed on at least one area of the rear side of the user terminal apparatus at operation S1310. If a user input to release the lock screen is sensed, a different home screen is provided based on the display area where the user input is sensed at operation S1320.

Here, the operation S1310 of providing a lock screen may include sensing a user input to provide a lock screen on a display and determining the display area where the lock screen is provided based on the orientation of the user terminal apparatus at a time when the user input to provide the lock screen is sensed.

In addition, the operation S1310 of providing a lock screen may further include changing at least one of the type and the shape of the lock screen based on the display area where the lock screen is provided.

If the orientation of the user terminal apparatus is changed while the lock screen is provided, the step of changing at least one of the type, the shape of the lock screen and the display area where the lock screen is displayed may be further included.

In addition, the steps of sensing a user input of touching the lock screen and dragging the touched lock screen in the direction of another display area on the display and moving the lock screen to another display area and providing the lock screen may be further included.

In particular, if the user input of touching and dragging is sensed, the step of changing at least one of the type and the shape of the lock screen based on the display area where the lock screen is provided may be further included.

The operation S1320 of providing a home screen may include determining at least one of the type and the authorities of applications which is to be provided on the home screen based on the display area where the user input is sensed.

Here, the operation S1320 of providing a home screen may include including and providing a GUI for changing at least one of the type and the authorities of the applications in the home screen.

The lock screen may be one of a swipe lock screen, a biometric information lock screen, a pattern lock screen, a PIN lock screen, and a password lock screen.

According to the above-described various embodiments, a user terminal apparatus may provide various lock screens and home screens using displays which are disposed on the front side and the rear side. Accordingly, apparatus usability and convenience can be enhanced.

In the above embodiments, a main display area and a sub display area are taken as examples, but this is only an example. The same technical features can be applied to the round display area.

The methods according to such various embodiments may be programmed and stored in various storage medium. Accordingly, the methods according to the above-described various embodiments can be implemented in various types of electronic apparatuses which execute the storage medium.

Specifically, a non-transitory computer readable medium which stores a program to perform the above-described controlling methods sequentially may be provided.

The non-transitory recordable medium refers to a medium which may store data semi-permanently rather than storing data for a short time, such as register, cache, memory, and the like, and is readable by an apparatus. Specifically, the above-described various applications and programs may be stored and provided in a non-transitory recordable medium such as compact disc (CD), digital versatile disc (DVD), hard disk, Blu-ray disc, USB, memory card, ROM, and the like.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A user terminal apparatus comprising:
   a display comprising:
      a main display area disposed on a front side of the user terminal apparatus, and
      a sub display area extended from one side of the main display area to be disposed on at least one area of a rear side of the user terminal apparatus; and
   at least one processor configured to:
      provide a lock screen to a display area of at least one of the main display area or the sub display area,
      in response to a user input of releasing the lock screen being sensed in the main display area, control the display to provide a first home screen, and
      in response to a user input of releasing the lock screen being sensed in the sub display area, control the display to provide a second home screen different from the first home screen.

2. The apparatus of claim 1, wherein the at least one processor is further configured to, in response to a user input for providing the lock screen being sensed on the display, determine a display area where the lock screen is to be provided based on an orientation of the user terminal apparatus at a time when the user input for providing the lock screen is sensed.

3. The apparatus of claim 2, wherein the at least one processor is further configured to change at least one of a type or a shape of the lock screen based on the display area where the lock screen is provided.

4. The apparatus of claim 1, wherein the at least one processor is further configured to, in response to an orientation of the user terminal apparatus being changed while the lock screen is provided, change at least one of a type, a shape or a display area of the lock screen.

5. The apparatus of claim 1, wherein the at least one processor is further configured to:
   provide the lock screen to one of the main display area or the sub display area, and
   in response to a user input of touching the lock screen and dragging the touched lock screen in a direction of another display area on the display being sensed, move the lock screen to the other display area.

6. The apparatus of claim 5, wherein the at least one processor is further configured to, in response to the user input of touching and dragging the lock screen being sensed, change at least one of a type or a shape of the lock screen based on the display area where the lock screen is provided.

7. The apparatus of claim 1, wherein the at least one processor is further configured to determine at least one of a type of an application to be provided on the home screen or access rights of the application based on the display area where the user input is sensed among the main display area and the sub display area.

8. The apparatus of claim 7, wherein the at least one processor comprises a graphical user interface (GUI) configured to:
   change at least one of the type of the application or the access rights of the application in the home screen, and
   provide the home screen.

9. The apparatus of claim 1, wherein the lock screen is one of a swipe lock screen, a biometric information lock screen, a pattern lock screen, a personal identification number (PIN) lock screen, or a password lock screen.

10. A controlling method of a user terminal apparatus including a display comprising a main display area disposed on a front side of the user terminal apparatus and a sub display area extended from one side of the main display area to be disposed on at least one area of a rear side of the user terminal apparatus, the method comprising:
    providing a lock screen to a display area of at least one of the main display area or the sub display area;
    in response to a user input of releasing the lock screen being sensed in the main display area, providing a first home screen; and
    in response to a user input of releasing the lock screen being sensed in the sub display area, providing a second home screen different from the first home screen.

11. The method of claim 10, wherein the providing of the lock screen comprises:
    sensing a user input for providing the lock screen on the display; and
    determining the display area where the lock screen is provided based on an orientation of the user terminal apparatus at a time when the user input for providing the lock screen is sensed.

12. The method of claim 11, wherein the providing of the lock screen further comprises:
    changing at least one of a type or a shape of the lock screen based on the display area where the lock screen is provided.

13. The method of claim 10, further comprising:
    in response to an orientation of the user terminal apparatus being changed while the lock screen is provided, changing at least one of a type, a shape, or the display area of the lock screen.

14. The method of claim 10, further comprising:
    sensing a user input of touching the lock screen and dragging the touched lock screen in a direction of the other display area on the display; and
    moving the lock screen to another display area and providing the lock screen.

15. The method of claim 14, further comprising:
    in response to the user input of touching and dragging the lock screen being sensed, changing at least one of a type or a shape of the lock screen based on the display area where the lock screen is provided.

16. The method of claim 10, wherein the providing of the first home screen or the second home screen comprises determining at least one of a type of an application to be provided or access rights of the application based on the display area where the user input is sensed among the main display area and the sub display area.

17. The method of claim 16, wherein the providing of the first home screen or the second home screen further comprises including a graphical user interface (GUI) for changing at least one of a type of the application or access rights of the application.

18. The method of claim 10, wherein the lock screen is one of a swipe lock screen, a biometric information lock screen, a pattern lock screen, a personal identification number (PIN) lock screen, or a password lock screen.

19. A computer executable program code recorded on a computer readable non-transitory storage medium, wherein the computer executable program code when executed by the at least one processor, configures the at least one processor to perform the method of claim 10.

20. A user terminal apparatus comprising:
a display comprising:
   a main display area disposed on a front side of the user terminal apparatus,
   a sub display area extended from one side of the main display area to be disposed on at least one area of a rear side of the user terminal apparatus, and
   a round display area which connects the main display area and the sub display area; and
at least one processor configured to:
   provide a lock screen to a display area of at least one of the main display area, the sub display area, or the round display area,
   in response to a user input of releasing the lock screen being sensed in the main display area, control the display to provide a first home screen, and
   in response to a user input of releasing the lock screen being sensed in the sub display area, control the display to provide a second home screen different from the first home screen,
wherein the round display area is distinguished from the main display area and the sub display area by border lines set by the user.

* * * * *